United States Patent
Mani et al.

(10) Patent No.: US 11,502,973 B2
(45) Date of Patent: Nov. 15, 2022

(54) VOICE DATA TRANSMISSION WITH ADAPTIVE REDUNDANCY

(71) Applicant: Imagination Technologies Limited, Kings Langley (GB)

(72) Inventors: Senthil Kumar Mani, Hyderabad (IN); Prasad Puram, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 1635 days.

(21) Appl. No.: 14/485,482

(22) Filed: Sep. 12, 2014

(65) Prior Publication Data
US 2015/0078372 A1 Mar. 19, 2015

(30) Foreign Application Priority Data

Sep. 18, 2013 (GB) ...................................... 1316575
Mar. 28, 2014 (GB) ...................................... 1405588

(51) Int. Cl.
*H04L 49/20* (2022.01)
*H04L 1/00* (2006.01)
(Continued)

(52) U.S. Cl.
CPC .......... *H04L 49/206* (2013.01); *G10L 19/005* (2013.01); *G10L 19/167* (2013.01);
(Continued)

(58) Field of Classification Search
CPC ... H04L 49/206; H04L 47/22; H04L 43/0852; H04L 49/20; H04L 1/00; H04L 65/80;
(Continued)

(56) References Cited

U.S. PATENT DOCUMENTS 6,167,060 A    12/2000 Vargo et al.
7,065,485 B1 *  6/2006 Chong-White ..... G10L 21/0364
                                                    704/200.1
(Continued)

FOREIGN PATENT DOCUMENTS

CN    101030832 B    8/2011
CN    103632671 A    3/2014
(Continued)

OTHER PUBLICATIONS

Costa et al, "Dynamic Adaptation of Quality of Service for VoIP Communications", International Journal on Advances in Networks and Services, vol. 2 No. 2, 2009.
Hassan et al. "Variable packet size of IP packets for VoIP transmission" proceedings of the 24th IASTED International Multi-Conference Internet and MultiConference Internet and Multimedia Systems and Applications, Feb. 13-15, 2006, Innsbruck, Austria.
Mani et al. "DSP Subsystem for Multi Party Conferencing in VoIP", IMSAA 2009.
(Continued)

*Primary Examiner* — Walter J Divito
*Assistant Examiner* — Anthony Luo
(74) *Attorney, Agent, or Firm* — Potomac Law Group, PLLC; Vincent M De Luca

(57) ABSTRACT

Voice data transmission with adaptive redundancy creates a voice data packet by packetizing the voice data payload and a number of redundant payloads selected from a set of previous voice data payloads. The voice data from the voice data payload is analysed to determine whether it is a critical or non-critical payload by classifying the received voice data as voiced or unvoiced. If at least a portion of the voice data is classified as unvoiced, the voice data payload is determined to be a critical payload. If it is a critical payload, then the voice data payload is added to the set of previous voice data payloads for inclusion as a redundant payload in subsequent voice data packets. The voice data packet is then forwarded for transmission over the network.

20 Claims, 13 Drawing Sheets

(51) Int. Cl.
*H04L 65/80* (2022.01)
*H04L 1/08* (2006.01)
*G10L 19/16* (2013.01)
*G10L 19/005* (2013.01)
*H04L 65/70* (2022.01)
*H04L 65/75* (2022.01)
*H04L 43/0852* (2022.01)
*H04L 47/22* (2022.01)
*H04M 1/253* (2006.01)
*G10L 25/84* (2013.01)
*G10L 25/90* (2013.01)

(52) U.S. Cl.
CPC ............ *H04L 1/007* (2013.01); *H04L 1/0009* (2013.01); *H04L 1/0041* (2013.01); *H04L 1/08* (2013.01); *H04L 43/0852* (2013.01); *H04L 47/22* (2013.01); *H04L 65/70* (2022.05); *H04L 65/762* (2022.05); *H04L 65/80* (2013.01); *H04M 1/2535* (2013.01); *G10L 25/84* (2013.01); *G10L 25/90* (2013.01)

(58) Field of Classification Search
CPC ...... H04L 65/70; H04L 65/75; H04M 1/2535; H04M 1/253; G10L 19/16; G10L 19/005; G10L 25/84; G10L 25/90
See application file for complete search history.

(56) References Cited

U.S. PATENT DOCUMENTS

| | | | |
|---|---|---|---|
| 7,249,185 | B1 | 7/2007 | Shaffer et al. |
| 7,525,918 | B2 * | 4/2009 | LeBlanc ................. H04L 65/80 370/238 |
| 8,352,252 | B2 | 1/2013 | Fang et al. |
| 2006/0173673 | A1 * | 8/2006 | Jeong ................... G06F 17/2765 704/9 |
| 2007/0183323 | A1 | 8/2007 | Hannu et al. |
| 2008/0027717 | A1 * | 1/2008 | Rajendran ............. G10L 21/038 704/210 |
| 2010/0312552 | A1 * | 12/2010 | Zheng ................... H04L 1/0009 704/219 |
| 2011/0167061 | A1 * | 7/2011 | Li ..................... G06F 17/30244 707/728 |
| 2012/0218900 | A1 | 8/2012 | Michaelis |
| 2012/0265523 | A1 | 10/2012 | Greer et al. |

FOREIGN PATENT DOCUMENTS

| | | | |
|---|---|---|---|
| EP | 1168306 | A2 | 1/2002 |
| EP | 1980043 | A1 | 10/2008 |
| EP | 2438701 | A1 | 4/2012 |
| EP | 2684189 | A2 | 1/2014 |
| WO | WO 2004/079964 | A2 | 9/2004 |
| WO | WO 2007/089183 | A1 | 8/2007 |

OTHER PUBLICATIONS

Mani et al. "Enhanced ITU-T G.711 Packet Loss Concealment (PLC) Algorithm", ICETES 2006.
Rodbro et al."Rate-Distortion Optimal Time-Segmentation and Redundancy Selection for VoIP" IEEE transaction on Audio, Speech, and Language Processing, vol. 14, No. 3, May 2006.
Jayant et al. "Effects of Packet Losses in Waveform Coded Speech and Improvements due to an Odd-Even Sample-Interpolation Procedure," IEEE Transactions on Communications, vol. COM-29, No. 2, pp. 101-109, Feb. 1981.
Chandrasekhar et al., "Bandwidth-Efficient Voice Activity Detector", ICTES, Chennai-2007.
Watson et al. , "Measuring Perceived Quality of Speech and Video in Multimedia Conferencing Applications," Proceedings of ACM Multimedia, pp. 55-60, Sep. 1998.
Padhye, A New Adaptive FEC Loss Control Algorithm, Proceedings of the IEEE International Conference on Performance, Computing and Communication, Feb. 2000, pp. 307-313.
Choi et al., A Novel Error Control Scheme for Reliable Video Communication, IEICE Trans. on Communications, vol. 87, No. 12, pp. 3650-3662, 2004.
ITU-T Recommendation P.800. 1, "Mean Opinion Score (MOS) terminology," Jul. 2006.
Paksoy et al."An Adaptive Multi-Rate Speech Coder For Digital Cellular Telephony," in Proc. IEEE Int. Conf. Acoust., Speech, Signal Processing, Phoenix, 1999, pp. 193-196.
Lacan et al., "Reed-Solomon Forward Error Correction (FEC) Schemes", RFC 5510, Apr. 2009.
Li, "RTP Payload Format for Generic Forward Error Correction", RFC 5109, Dec. 2007.
Rosenberg et al.,"An RTP Payload Format for Generic Forward Error Correction", RFC 2733, Dec. 1999.
Sjoberg et al.,"Real-Time Transport Protocol (RTP) Payload Format and File Storage Format for the Adaptive Multi-Rate (AMR) and Adaptive Multi-Rate Wideband (AMR-WB) Audio Codecs" RFC 3267 Jun. 2002.
Perkins et al.,"RTP Payload for Redundant Audio Data", RFC 2198, Sep. 1997.
Schulzrinne et al., "RTP: A Transport Protocol for Real-Time Applications", STD 64, RFC 3550, Jul. 2003.
Sanneck et al, "Speech Property-Based FEC for Internet Telephony Applications", Proceedings of the SPIE/ACM SIGMM Multimedia Computing and Networking.
Conference, 2000, San Jose, CA Jan. 2000, pp. 1-14.
Choi, T.U., "Periodic FEC: A Novel Error Control Scheme for Reliable Video Communication", IEICE Trans. Commun., Dec. 2004, pp. 3650-3662, vol. 87 Issue 12.
Petracca et al, "Voice Transmission over 802.11 Wireless Networks Using Analysis-by-Synthesis Packet Classification", pp. 587-590, IEEE 2004.

\* cited by examiner

VOICE DATA TRANSMISSION WITH ADAPTIVE REDUNDANCY

BACKGROUND

In a typical packet-based communication system such as Voice over Internet Protocol (VoIP), audio data such as voice data from a sender (source) is digitized, compressed using an appropriate encoding algorithm and packetized at a transmitter at regular intervals (e.g., every 10 ms or multiple of 10 ms). The voice packet is then sent over the IP network to the receiver where it is decoded and played-out to the listener (destination). These VoIP applications use mostly UDP as the transport layer protocol. The Real-Time Transport Protocol (RTP) provides the additional information like sequence numbers and time stamps.

For a packet-based voice communication, good voice quality needs to be maintained throughout the call. Degradation of call quality results in poor quality of service (QOS). Packet loss is one of the most prominent problems impairing the QOS. Under a heavy traffic and congestion situation, the packet loss may exceed the acceptable limit leading to high buffering delay and degradation of voice quality.

To mitigate packet loss, redundancy can be introduced in the transmission. The receiver can regenerate the lost packets from the redundant data. The amount of redundant data transmitted depends on the voice quality required at the receiving end. For good voice quality, a large amount of redundant data is required. Owing to the large amount of redundant data, the bandwidth requirements can become significant. Unavailability of sufficient bandwidth for packet based voice communication may further worsen the call quality.

Furthermore, the addition of redundant data should also comply with known, widely supported packetisation and control protocol standards, to enable interoperability with existing devices and elements provided by different vendors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Voice data transmission with adaptive redundancy is described. Voice data is received and encoded as a voice data payload. A voice data packet is created by packetizing the voice data payload and a number of redundant payloads selected from a set of previous voice data payloads. The voice data from the voice data payload is analysed to determine whether it is a critical or non-critical payload by classifying the received voice data as voiced or unvoiced. If at least a portion of the voice data is classified as unvoiced, the voice data payload is determined to be a critical payload. If it is a critical payload, then the voice data payload is added to the set of previous voice data payloads for inclusion as a redundant payload in subsequent voice data packets. The voice data packet is then forwarded for transmission over the network.

According to one aspect, there is provided a method for transmitting a voice data packet with redundancy in a network, the method comprising: receiving voice data and encoding the voice data as a voice data payload; packetizing the voice data payload to generate the voice data packet comprising the voice data payload, the voice data packet further comprising a number of redundant payloads selected from a set of previous voice data payloads; determining whether the voice data payload is a critical payload or non-critical payload by classifying the received voice data as voiced or unvoiced, wherein, if at least a portion of the voice data is classified as unvoiced, the voice data payload is determined to be a critical payload; adding the voice data payload to the set of previous voice data payloads for inclusion as the redundant payload in subsequent voice data packets if the voice data payload is determined to be a critical payload; and forwarding the voice data packet for transmission over the network.

According to another aspect, there is provided a system for transmitting a voice data packet with redundancy in a network, the system comprising: an encoder configured to receive voice data and generate the voice data payload from the voice data; a packetizer configured to packetize the voice data payload to generate the voice data packet comprising the voice data payload, the voice data packet further comprising a number of redundant payloads selected from a set of previous voice data payloads; a packet identifier configured to determine whether the voice data payload is a critical payload or non-critical payload by classifying the received voice data as voiced or unvoiced, wherein, if at least a portion of the voice data is classified as unvoiced, the voice data payload is determined to be a critical payload, and, if the voice data payload is determined to be a critical payload, then the voice data payload is added to the set of previous voice data payloads for inclusion as the redundant payload in subsequent voice data packets; and a transmitter configured to forward the voice data packet for transmission over the network.

According to another aspect, there is provided computer readable code adapted to perform the steps of any of the methods when the code is run on a computer. A computer readable storage medium may have encoded thereon the computer readable code.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
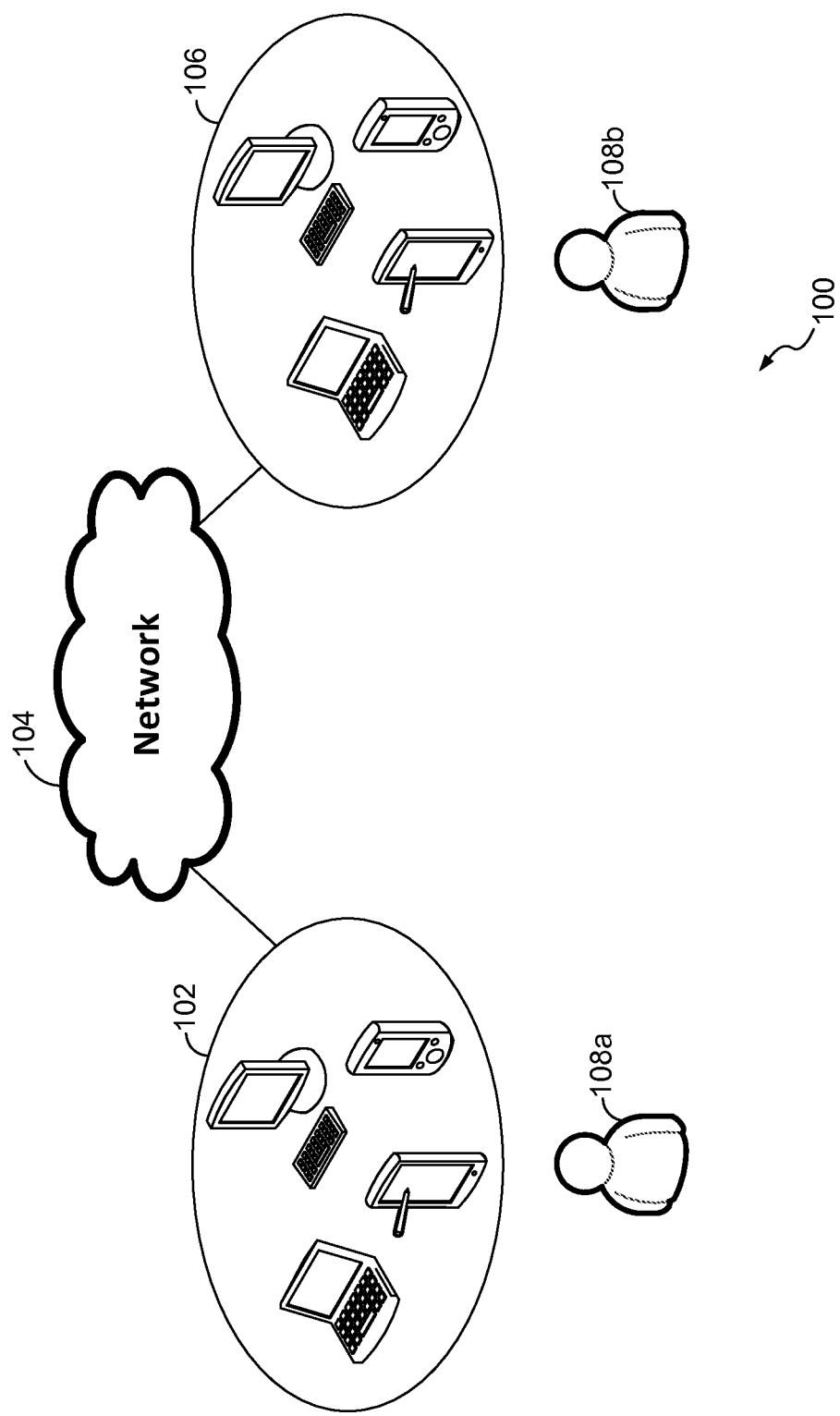
FIG. 1 is a diagram illustrating a communication system in which the presently disclosed examples can be implemented.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element.

Common reference numerals are used throughout the figures, where appropriate, to indicate similar features.

DETAILED DESCRIPTION

Embodiments will now be described by way of example only.

The present disclosure describes a bandwidth efficient communication system. The bandwidth efficient communication system includes a packet transmission module and a packet receiving module. The packet transmission module receives voice data which is encoded to generate a voice data payload for transmission into the network. The voice data may be determined to relate to a critical payload or a non-critical payload by the packet transmission module. The voice data payload is packetized into a voice data packet as a primary payload along with one or more redundant payloads. The redundant payloads are selected from a set of previous voice data payloads. The packet transmission module forwards the voice data packet into the network. At the receiving end the packet receiving module determines the sequence number of the redundant payloads and discards any duplicate redundant payloads or voice data payloads. The communication system operates using known, widely supported packetisation and control protocol standards, to enable interoperability with existing devices and elements provided by different vendors.

FIG. 1 is a diagram illustrating a communication system 100 in which the presently disclosed examples can be implemented. The bandwidth efficient communication system 100 may include a packet transmission module 102, a network 104, a packet receiving module 106 a first user 108*a* and a second user 108*b*.

In an example, the packet transmission module 102 is capable of receiving audio data from the first user 108*a*. The packet transmission module 102 may be connected to any device capable of receiving the audio data from the first user 108*a* such as, but not limited to, a microphone, a computer, a phone, and/or a Personal Digital Assistant (PDA). The audio data may be converted to a voice data packet by the packet transmission module 102 or may be received at the packet transmission module 102 already in the form of a voice data packet or payload for a packet. The packet transmission module 102 may further be capable of forwarding the voice data packet through the network 104 to the packet receiving module 106.

In an alternate example, the packet transmission module 102 may be incorporated into any digital communication software or hardware module enabled in a computing device such as a computer, a phone, a Personal Digital Assistant (PDA), or similar.

The network 104 refers to a medium for interconnecting the packet transmission module 102 and the packet receiving module 106. The network 104 may include a local area network (LAN), wide area network (WAN), metropolitan area network (MAN), the internet, or any combination thereof. Further, the network 104 may utilize various communication protocols e.g. transmission control protocol (TCP), user datagram protocol (UDP), Bluetooth®, IEEE 802.11, and the like. The network 104 may further utilize cellular network e.g. EDGE, 2G, 3G, LTE® and the like to establish connection between the packet transmission module 102 and the packet receiving module 106. The network 104 may also comprise any combination of wired and wireless communication links to interconnect the packet transmission module 102 and the packet receiving module 106.

In an example, the packet receiving module 106 is capable of receiving the voice data packet from the network 104. The packet receiving module 106 may further regenerate the audio data from the received voice data packet. The packet receiving module 106 may be connected to any device capable of outputting the audio data to the second user 108*b*, such as, but not limited to, a computer, a phone, a Personal Digital Assistant (PDA), and/or a speaker.

In an alternate example the packet receiving module 106 may be embedded in any device capable of outputting the audio data to the second user 108*b*, such as, but is not limited to, a computer, a phone, a Personal Digital Assistant (PDA), or similar device.

The devices, in which the packet transmission module 102 and the packet receiving module 106 are present, operate on RTP/RTCP (Real Time Protocol/Real Time Control Protocol). It will be appreciated by a person having ordinary skill in the art that the devices in which the packet transmission module 102 and the packet receiving module 106 are enabled may support different RTP/RTCP protocols. The presently disclosed examples are capable of reducing packet data loss between clients operating on different RTP/RTCP protocols, which may support different RTP/RTCP features.

Figure 2:
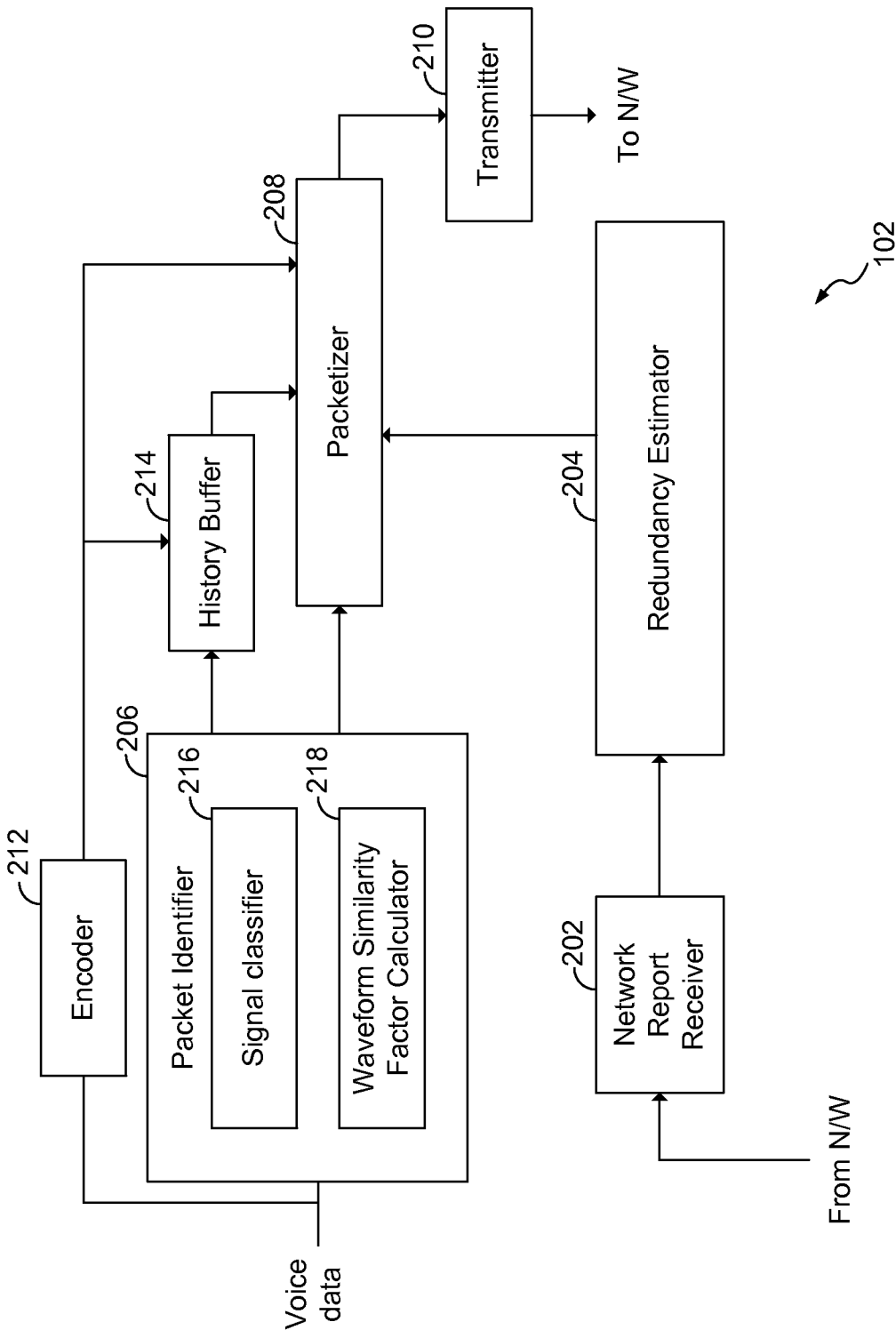
FIG. 2 is a block diagram illustrating a packet transmission module of the bandwidth efficient communication system.

FIG. 2 is a block diagram illustrating the packet transmission module 102 of the bandwidth efficient communication system 100. In an example, the packet transmission module 102 includes a network report receiver 202, a redundancy estimator 204, a packet identifier 206, a packetizer 208, a transmitter 210, an encoder 212 and a history buffer 214.

The network report receiver 202 receives a network statistics report from the network 104. In an example, the network report receiver 202 may receive the network statistics report from the packet receiving module 106.

The redundancy estimator 204 is connected to the network report receiver 202. The redundancy estimator 204 is capable of unpacking or decoding lost packet statistics and/or out-of-order packet statistics from the network statistics report. The redundancy estimator 204 can further estimate a redundancy value using the unpacked information from the network statistics report. The redundancy estimator 204 may also optionally use information about the voice data to further optimize the redundancy value on a packet-by-packet basis.

The redundancy estimator 204 may be connected to the packetizer 208 and provide the estimated redundancy value. The packetizer 208 may be connected to the packet identifier 206 and the transmitter 210.

The packet identifier 206 receives the voice data and determines whether the payload containing this voice data will be a critical payload or a non-critical payload. To make this determination the packet identifier 206 may include a signal classifier 216 and a waveform similarity factor calculator 218.

The signal classifier 216 may classify the voice data payload as voiced or unvoiced. The waveform similarity factor calculator 218 may calculate a waveform similarity factor for voice data classified as voiced.

The history buffer 214 is connected to the packet identifier 206 and the packetizer 208. The history buffer 214 maintains a set of information about previous voice data payloads. The information may include, but is not limited to a critical/noncritical flag, a dropped flag, and a payload size.

The encoder 212 may encode the voice data to generate a voice data payload. The voice data may be encoded using any suitable encoding scheme, such as, but not limited to, ITU-T G.711, ITU-T G.726, ITU-T G.727, ITU-T G.729, ITU-T G.729A, Internet Low Bit-rate Codec (iLBC), Adaptive Multi-rate audio Codec Narrow band (AMR NB), Adaptive Multi-rate audio Codec Wide band (AMR WB), Speex, Global System for Mobile communication Full Rate (GSM FR), ITU-T G.722, ITU-T G.722.1 encoding. The encoded voice data payload may be provided to the history buffer 214 and the packetizer 208.

The packetizer 208 may receive the voice data payload from the encoder 212. Based on the redundancy value received from the redundancy estimator 204, the packetizer 208 may generate a voice data packet comprising the voice data payload as the primary payload. The packetizer 208 may access information about the set of previous voice data payloads from the history buffer 214. The set of previous voice data payloads may be included in the voice data packet as redundant data (i.e. data that is in addition to the primary payload).

In one example, the packetizer 208 may packetize the data according to the RFC2198 packet handling scheme. RFC2198 provides the RTP payload format for the transmission of the encoded audio data in a redundant fashion and does not require any mathematical reversible codec at the sender or receiver. A redundancy level specifies the number of redundant payloads included in an RFC2198 packet.

The transmitter 210 is capable of forwarding the voice data packet to the network 104 for transmission. The transmitter 210 may also be configured to determine whether to selectively drop the voice packet so that it is not transmitted into the network 104, as will be described in more detail below. In the event that the voice data packet is dropped, the voice data payload from the packet may be flagged as a dropped voice data payload in the history buffer 214 and so that the dropped voice data payload may be transmitted in an upcoming transmission.

Figure 3:
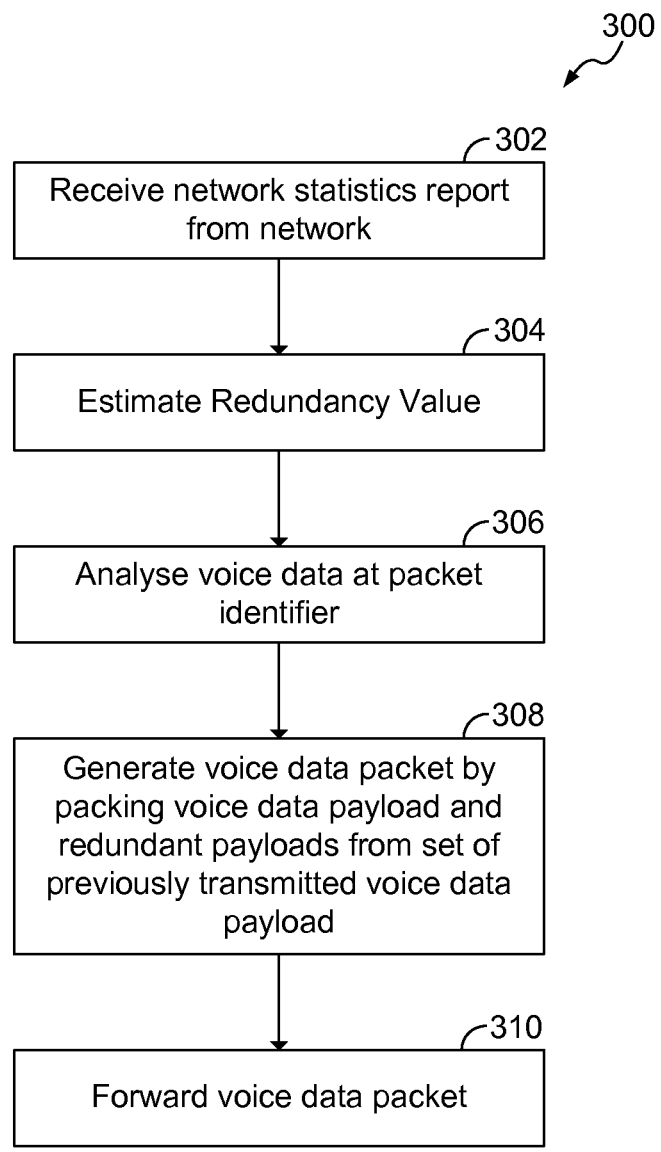
FIG. 3 is a flow diagram illustrating an overview of a method for transmitting a voice data packet with redundancy in a network.

FIG. 3 is a flow diagram illustrating an overview of a method 300 for transmitting the voice data packet with redundancy in the network.

At step 302, the network report receiver 202 receives the network statistics report from the network 104. The network statistics report may be a RTCP report. At step 304, the redundancy estimator 204 estimates the redundancy value based on the network statistics report.

At step 306, the packet identifier 206 analyses the voice data. At step 308, the packetizer 208 generates the voice data packet by packing the voice data payload and one or more redundant payloads in accordance with the redundancy value derived in step 304. The one or more redundant payloads may be selected from the set of previous voice payloads.

At step 310, the transmitter 210 forwards the voice data packet for transmission over the network 104.

Figure 4A:
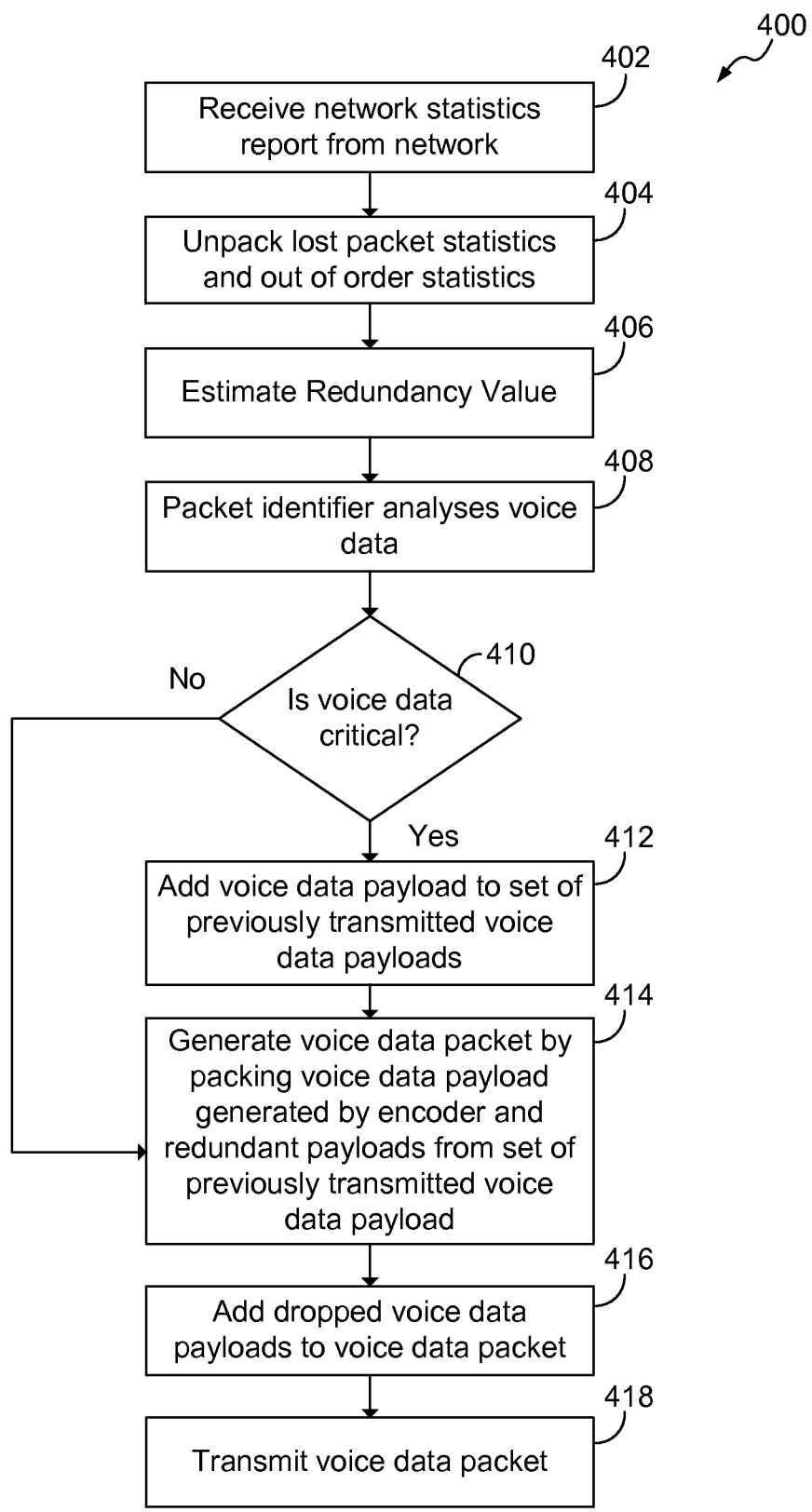
FIG. 4A is a flow diagram illustrating a detailed method for transmitting a voice data packet with redundancy in a network.

FIG. 4A is a flow diagram illustrating a further method 400 for transmitting the voice data packet with redundancy in the network.

At step 402, the network report receiver 202 receives the network statistics report. The network statistic report may contain lost packet statistics and/or out-of-order packet statistics.

At step 404, the redundancy estimator 204 unpacks or decodes the lost packet statistics and/or the out-of-order packet statistics.

For instance, in one example, the network statistics may be retrieved from the network statistics report for an RTCP packet. For example, the RTCP packet may be an "application-defined RTCP packet" generated by the receiver side, as described in more detail below. In the case of the application-defined RTCP packet, the lost packet statistics and the out-of-order packet statistics may be received as four, 32-bit data blocks. A first 32-bit data block and a second 32-bit data block may refer to lower and higher parts of the lost packet statistics and a third 32-bit data block and a fourth 32-bit data block may refer to the lower and higher parts of the out-of-order packet statistics. In an example, each two bit pair (even and subsequent odd bit) of the lost packet statistics represents a particular quantized loss order. For example, the first 2-bits of the lower part of the lost packet statistics may be extracted to a zero-th position of a packet loss order distribution buffer. Similarly the third bit and the fourth bit of the lower part of the lost packet statistics may be extracted to a first position of the packet loss order distribution buffer. In the same way all the 32 bits of the lower part of the lost packet statistics may be unpacked into the packet loss order distribution buffer, from the zero-th position of the packet loss order distribution buffer to a fifteenth position of the packet loss order distribution buffer.

The first 2-bits of the higher parts of the lost packet statistics may be extracted to a sixteenth position of the packet loss order distribution buffer. Similarly the remaining bits of the higher order of the lost packet statistics may be unpacked into the packet loss order distribution buffer, from the seventeenth position of the packet loss order distribution buffer to a twenty-ninth position of the packet loss distribution buffer. In this example, bits 27 to 31 of the higher part are not used.

In this example, the unpacked distribution buffers will have the values from 0 to 3 at each position (due to each position containing 2 bits). Each 2-bit value at a given position represents a value or range for a histogram of the network packet loss statistics, as illustrated in the table below. The histogram may represent the distribution of consecutively lost packets, such that the position in the buffer represents the number of consecutively lost packets, and the value represents the frequency.

| 2-Bit Value in Distribution Buffer | Value Representation |
| --- | --- |
| 0 | 0 |
| 1 | 1 or 2 |
| 2 | 3 to 7 |
| 3 | Greater than 8 |

In a similar manner, the lower and higher parts of the out-of-order packet statistics may be unpacked to create an out-of-order distribution buffer in the case of an application-defined RTCP packet. These can be translated to values for a histogram of the network packet out-of-order statistics using a similar table to that above. For example, the histogram may represent the distribution of consecutive out-of-order packets, such that the position in the buffer represents the number of consecutive out-of-order packets, and the value represents the frequency.

Note that, in other examples, different types of network statistics can also be used, such as percentage packet loss or percentage out-of-order statistics, rather than the fine-grained statistics described above.

At step 406, the redundancy estimator 204 estimates the redundancy value based on the network statistics. The redundancy value may be calculated in different ways using the network statistics, depending on a mode of operation of the bandwidth efficient communication system 100. Alternatively, the bandwidth efficient communication system 100 may configure the mode of operation depending on the RTCP features supported (and hence the network statistics reported) by the client participating in the communication.

In a first example, the redundancy value may be estimated using an aggregate packet loss statistic and a look-up table for the redundancy value. For example, the look-up table may comprise a first predefined list and a second predefined list. The first predefined list may contain a set of values related to the network packet loss statistics, such as the percentage packet loss. The network packet loss may be derived from the lost packet statistics described above or may be directly obtained from an RTCP network statistics report. The second predefined list may contain a set of values related to a maximum redundancy depth (MRD). A table index may be determined from the first predefined list based on the network packet loss, for example as the lowest index of the table having an associated value greater than or equal to the network packet loss. The maximum redundancy depth (MRD) may be derived from the second predefined list as the value at that index.

For instance, assume the first predefined list to have values of {0, 1, 5, 9, 13, 17, 100} and the second predefined list to have values of {0, 2, 4, 6, 8, 10, 12}. So, for network packet loss to be 13, the table index is equal to 4. Hence the corresponding value of the estimated MRD from the second predefined list is 8.

Note that, in other examples, different types of comparisons or lookups can be used to achieve the same effect.

In a second example, the redundancy value may be estimated by filtering the packet loss order distribution buffer described above. For example, the packet loss order distribution buffer can be searched to find a location within the packet loss order distribution buffer that has one or more values that match one or more predetermined values. For example, a 2D windowed filter can be used as described below, although other filtering techniques can be used in alternative examples. Filtering may be used to remove outliers from the packet loss statistics.

For instance, the table below illustrates an example packet loss distribution buffer, with the buffer indices shown above the buffer values for convenience. The 2D windowed filter aims to find the smallest index value corresponding to a location immediately prior to a predefined consecutive number of zeroes (the window size). For example, if a short window of length 3 is applied to the table below, then index 16 is the first position in the buffer that is followed by three consecutive zeroes. In another example, if a longer buffer of length 6 is used, then index 20 is the location preceding six consecutive zeroes. The index value derived from the 2D filter can be used to derive the MRD, e.g. using a look-up table as in the example above.

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 3 | 3 | 2 | 2 | 2 | 2 | 2 | 2 | 2 | 1 | 1  | 0  | 1  | 1  | 1  | 0  | 1  | 0  | 0  | 0  | 1  | 0  | 0  | 0  | 0  | 0  | 0  | 0  | 0  | 0  | 1  | 0  |

In a further example, a first zero index corresponding to the location of a first zero value in the packet loss distribution buffer may be used to estimate the MRD. This is similar to a window size of 1 in the above example, and would correspond to index 11 in the table above. In another exemplary implementation, the MRD can be derived using the value at a location having a predefined relationship to the first zero index, such as the value at the location of (zero index-2), which corresponds to index 9 in the table above.

The above examples derive a value for the MRD. The MRD values can be used to estimate the redundancy value using any one of a number of different techniques. In a first example, any increase in the MRD from a previously estimated redundancy value results in the redundancy value being set to be equal to the MRD. In the case that the MRD is less than the previously estimated redundancy values for a predefined number of estimations, then the redundancy value is estimated by decrementing the previous redundancy value. Example pseudo code for such a technique is illustrated below, where MRD(k) represents the $k^{th}$ estimate of the MRD, and RV(k) is the redundancy value at k. In this example, the system waits until the MRD is less than the redundancy value for five consecutive estimates before decrementing the redundancy value.

```
if (MRD (k) > RV (k–1) ) )
{
    RV (k) = MRD (k)
    wait_cnt (k) = 0
}
else
{
    wait_cnt (k) = wait_cnt (k–1) + 1
    if (wait_cnt (k) >= 5)
    {
        RV (k) = (RV (k–1) – 1)
        wait_cnt (k) = 0
    }
    else
        RV (k) = RV (k – 1)
}
```

In a second example, the redundancy value may be estimated as the maximum of a number of past MRD values. For instance, the redundancy value may be estimated as the maximum of the past 12 MRD values.

It may be understood by a person having ordinary skill in the art that any of the methods explained above may be utilized for the estimation of the redundancy value, or combined as appropriate.

In the above described examples, the redundancy value is determined for each network statistics report received (i.e. at each estimate of the MRD). Several packets may be transmitted between each network statistics report, and therefore, in some examples, the redundancy value may be further refined on a packet level. This may be done because sending redundant payloads for all the packets may not represent efficient bandwidth use. The redundancy value can be refined at the packet level based on the type of the current packet and one or more past packets, for example if it is a DTMF, DTX, SID or SPEECH packet. This refined redundancy value (denoted Nr(n)) is used as the number of the redundant payloads to be packed with the primary payload for every packet transmission at the $n^{th}$ packet/sequence number.

Figure 4B:
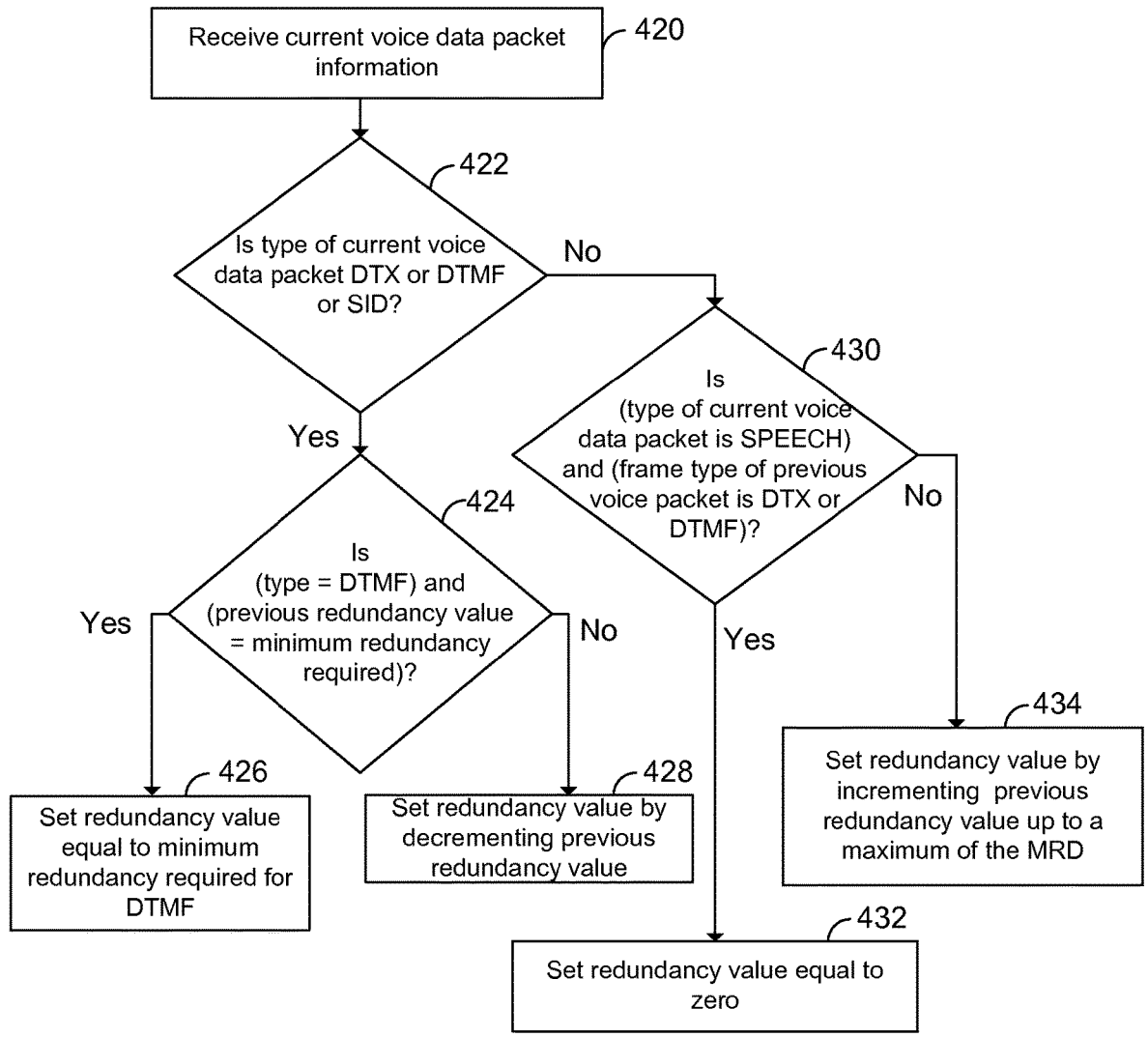
FIG. 4B is a flow diagram illustrating a detailed method for estimating redundancy level based on packet type.

For example, the refined redundancy value can be calculated as shown in FIG. 4B. FIG. 4B is a flow diagram illustrating a method for estimating redundancy level based on packet type.

At step 420, the redundancy estimator 204 receives information about the current voice data payload to further optimize the redundancy value at packet level based on the type of packet that the current voice data payload corresponds to.

At step 422, the redundancy estimator 204 determines whether the type of the voice data packet is DTX, DTMF or SID. The method proceeds to step 424 in the case that the frame type is DTX, DTMF or SID.

At step 424, the redundancy estimator 204 checks whether the voice data packet is of a specific type, and also whether the previous redundancy value is equal to the minimum redundancy required for that type. In an example, the redundancy estimator 204 may check whether the voice data packet is of DTMF type, and whether the redundancy value is equal to the minimum value for DTMF (e.g. 3).

The method will proceed to step 426 in the case that both the conditions of type and previous redundancy value being equal to the minimum required are met. At step 426 the refined redundancy value is maintained at the minimum redundancy required.

In the event that the check fails in step 424, then the method proceeds to step 428. At step 428, the redundancy value is set by decrementing the previous redundancy value by 1.

Returning to step 422, when the determination of frame type being DTX, DTMF or SID fails at step 422, the method proceeds to step 430. At step 430, a check is made whether the type of the current voice packet is SPEECH. The type of the previous voice packet is also checked at step 430. The method proceeds to step 432 if the check is found true at step 430.

At step 432, the redundancy value is set to zero. In other words, the redundancy is re-started when the packet type changes to speech. In an example, when the type of current voice packet is SPEECH and the type of previous voice packet is DTX or DTMF, the redundancy value is reset to zero.

Returning to step 430, if the type of current voice data packet is similar to the type of previous voice packet (for e.g. both the voice data packets are SPEECH), the method step moves to step 434. At step 434, the redundancy value of the current voice data packet is set by incrementing the previous redundancy value by one, unless the previous redundancy value equals the MRD, in which case the redundancy value is set to the MRD.

Referring again to FIG. 4A, at step 408, the packet identifier 206 analyses the voice data.

At step 410, the packet identifier 206, optionally determines whether the payload containing the received voice data will be a critical payload or a non-critical payload. In one example, a critical payload is a voice data payload that cannot be concealed by the receiver if it gets lost in the network, and a non-critical payload is a voice data payload that can be concealed by the receiver if it gets lost in the network. To save the bandwidth utilization, non-critical payloads are not packed as redundant payloads as they can be concealed even if they are lost in the network. To classify a payload as critical or non-critical, the signal and speech temporal characteristics of the voice data are estimated and are compared with the past payloads' signal characteristics. A technique for determining the critical and non-critical payloads will now be explained in greater detail in conjunction with FIG. 5.

Figure 5:
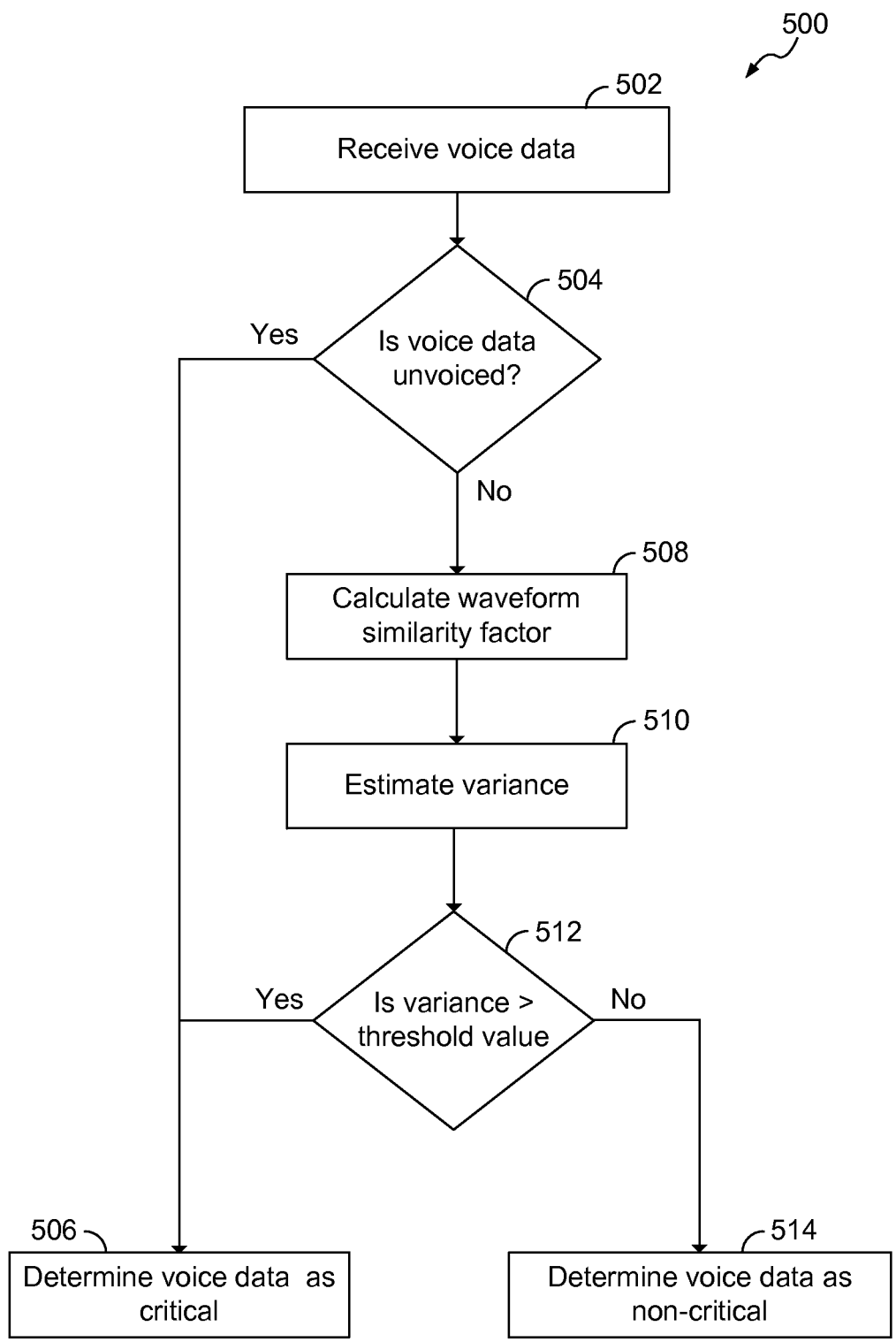
FIG. 5 is a flow diagram illustrating a method for determining whether a voice data payload is a critical payload or non-critical payload.

FIG. 5 is a flow diagram illustrating a method 500 for determining whether the voice data will result in a critical payload or non-critical payload.

At step 502, the packet identifier 206 receives the voice data. The voice data may be segmented into fixed size data. The fixed size may be 10 ms in one example.

At step 504, a signal classifier 216 classifies each segment of the voice data as voiced or unvoiced. A voiced sound is one created by the vocal cords vibrating, and an unvoiced sound is one created where the vocal cords do not vibrate.

If, at step 504, one or more segments of the voice data is classified as unvoiced then the voice data payload as a whole maybe classified as a critical payload in step 506.

Conversely, if, at step 504, all of the segments of the voice data are classified as voiced then, at step 508, the waveform similarity factor calculator 218 calculates the waveform similarity factor. In one example, the calculation of the waveform similarity factor may be performed based on the pitch of the voiced data. Alternatively, if the voiced data is determined to be noise, then the waveform similarity factor can be set to zero. Wf(n) can be used to denote the waveform similarity factor of the current ($n^{th}$) payload.

At step 510, the packet identifier 206 estimates a variance of the calculated waveform similarity factor. For instance, the variance may be estimated for the voice data for the current payload and a predefined number of previous payloads. For example, in the case that two previous payloads are considered, the estimated variance may be obtained from the following equation:

$$Vf(n)=\sigma^2(Wf(n),Wf(n-1),Wf(n-2))$$

Where:
 Vf(n): Variance;
 Wf(n): Waveform Similarity factor of the current voice payload;
 Wf(n−1): Waveform Similarity factor of a voice payload preceding the voice data payload by one; and
 Wf(n−2): Waveform Similarity factor of a voice payload preceding the voice payload by two.

At step 512, if the variance is greater than a threshold value then at step 506 the packet identifier 206 determines that the voice data relates to a critical payload.

However, if, at step 512, the variance is less than or equal to the threshold value then at step 514, the packet identifier 206 determines that the voice data relates to a non-critical payload.

Referring again to FIG. 4A, in the event that, at step 410, the voice data is determined to relate to a critical payload, then at step 412, an indication is made that the payload corresponding to this voice data may be added to the set of previous voice data payloads in the history buffer 214 (once this voice data payload has been generated by the encoder). This means that, for a subsequent packet, this voice data payload will be available to be packed as redundant data. Conversely, non-critical payloads are not added to the set of previous voice data payloads, and hence will not be packed as redundant data. In alternative examples, all payloads are added to the set of previous voice data payloads, but each payload is flagged as whether it was classified as critical or non-critical. This enables just the critical payloads to be selected for subsequent packets, if desired. In other examples that do not include the classification of critical/non-critical payloads, then all voice data payloads are added to the set of previous voice data payloads and are available to be included as redundant payloads in future packets.

At step 414, the packetizer 208 generates the voice data packet by packing the voice data payload generated by the encoder. In an example, the packetizer 208 may generate the voice data packet based on RFC 2198. The voice data packet further includes one or more redundant payloads selected from the set of previous voice data payloads. The number of redundant payloads included is equal to the redundancy value estimated at step 406. In one example, the most recent payloads in the set of previous voice data payloads are selected. In some examples the packetizer 208 may select just payloads flagged as critical as redundant payloads.

At step 416, the packetizer 208 may further add one or more dropped voice data payloads flagged as such in the history buffer 214 (regardless of whether they are critical or non-critical payloads) into the voice data packet as redundant data.

At step 418, the transmitter 210 determines whether to transmit the voice data packet into the network. In some examples, all voice data packets are transmitted into the network. In other examples, virtual packet loss is induced before transmitting to the network by dropping one or more packets for every packet transmitted. This can be done to avoid network congestion and reduce header overhead on bandwidth usage. When a packet is dropped, the primary payload is flagged as "dropped" in the history buffer 214. Flagging the payload as dropped ensures that it will be transmitted at least once as primary or redundant data, regardless of whether it is critical or non-critical. Furthermore, the sequence number and the timestamp of the packet are updated to account for the un-transmitted packets which are dropped during virtual packet loss.

Figure 6:
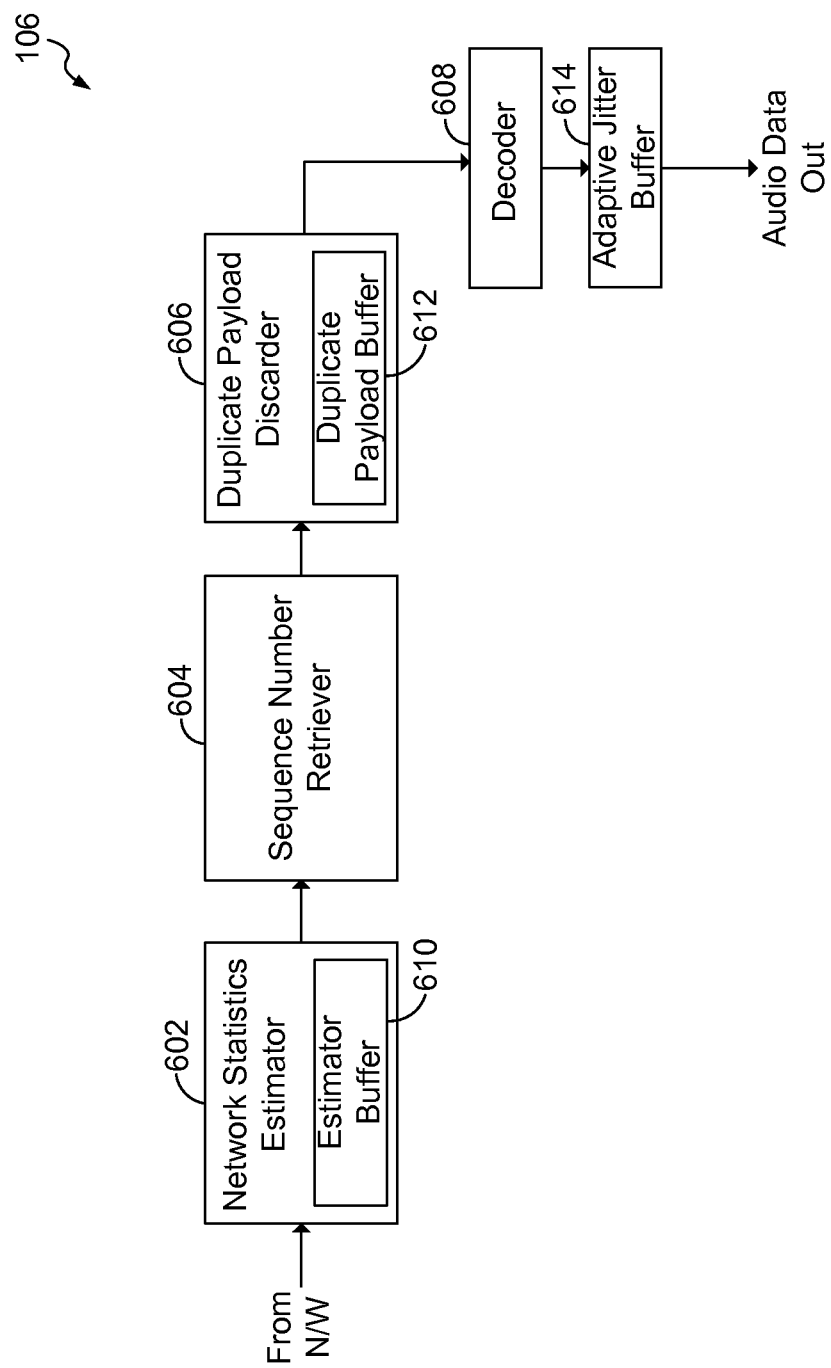
FIG. 6 is a block diagram illustrating a packet receiving module.

Reference is now made to FIG. 6, which illustrates a block diagram of the packet receiving module 106.

The packet receiving module 106 may include a network statistics estimator 602, a sequence number retriever 604, a duplicate payload discarder 606, a decoder 608, and an adaptive jitter buffer 614.

The network statistics estimator 602 receives the voice data packet sent over the network from the packet transmission module 102 and generates the network statistics report as utilized by the packet transmission module 102 and described above. The network statistics estimator 602 may be connected to the sequence number retriever 604 or may operate in parallel with it. The received voice data packets are unpacked to retrieve the voice data payload and the one or more redundant payloads. The sequence number retriever 604 retrieves a sequence number for each of the redundant payloads unpacked from the received voice data packet. Based on the sequence number retrieved, the duplicate payload discarder 606 discards the redundant payloads which are duplicated. The decoder 608 rearranges the received payloads, decodes the payloads and plays out the audio data to the second user 108b.

The network statistics estimator 602 receives the voice data packet from the packet transmission module 102. In one example, in order to estimate the network statistics, the network statistics estimator 602 includes an estimator buffer 610. By default the estimator buffer 610 is filled initially with fixed values. The fixed values may be 0 for the estimator buffer 610.

Upon receiving a voice data packet, the network statistics estimator 602 calculates an index value equal to the difference between a sequence number of the voice data packet and the sequence number of a predefined previously received voice data packet. For example, if the predefined previously received voice data packet is the first packet received, and this corresponds to the first index value, then the index value for the current packet is the offset between the current packet's sequence number and the first packet's sequence number. The index value maps to a location in the estimator buffer 610.

If the sequence number of the voice data packet is the maximum value so far received, then the voice data packet received is an in-order data packet and the estimator buffer 610 is filled with a first predefined value at the index location. If the sequence number is not the largest so far received, then the voice data packet received is an out-of-order data packet and the estimator buffer 610 is filled with a second predefined value at the index location.

For example, if the voice data packet is an in-order packet then the first predefined value may be 1. And, if the voice data packet is an out-of-order packet then the second predefined value may be 2. The default value may be 0 in the estimator buffer 610 indicating that the voice packet corresponding to that location has not been received.

Figure 7:
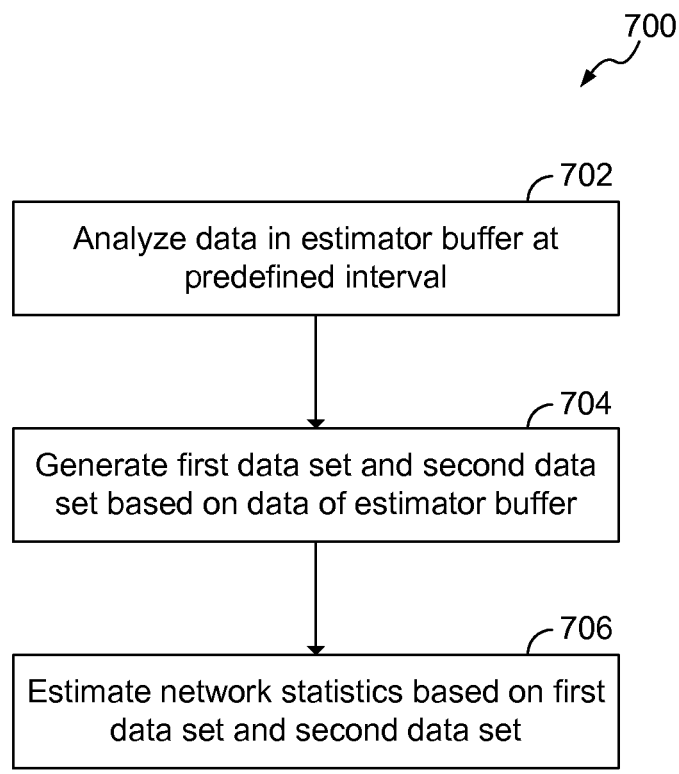
FIG. 7 is a flow diagram illustrating a method for estimating a network statistics of a network.

The network statistics estimator 602 may estimate the network statistics based on the data stored in the estimator buffer 610 when the index value is equal to or greater than a predefined threshold value. The method of estimating the network statistics of the network is explained in conjunction with the flow diagram of FIG. 7.

At step 702, the network statistics estimator 602 analyses the data in the estimator buffer 610. At step 704, a first data set will be generated based on the occurrence of the second predefined value (e.g. 2 in the above example) and a second data set will be generated based on occurrence of the default value (e.g. 0 in the above example).

The first data set relates to the number of voice data packets received out-of-order. Similarly, the second data set relates to the number of voice data packets lost in the network (i.e. the voice data packet not received).

In one example, the first and second data sets generated by the network statistics estimator 602 can be in the form of buffers representing histograms. The first data set may be a buffer representing a histogram of the number of times over the measurement period (e.g. 64 packets) that consecutive packets were received out-of-order. For example, the buffer may represent the histogram such that the position in the buffer represents the number of consecutive out-of-order packets, and the value represents the frequency associated with that number. Similarly, the second data set may be a buffer representing a histogram of the number of times over the measurement period (e.g. 64 packets) that consecutive packets were lost. For example, the buffer may represent the histogram such that the position in the buffer represents the number of consecutive lost packets, and the value represents the frequency associated with that number.

At step 706, the network statistics estimator 602 estimates the network statistics based on the first data set and the second data set. The out-of-order packet statistics may be calculated using the first data set. The lost packet statistics may be estimated using the second data set.

In some examples, the network statistics estimator 602 may also be arranged to calculate aggregate network statistics instead of (or in addition to) fine-grained statistics such as histograms. These may be based on counters. For example, one counter may incremented for each occurrence of the second predefined value (e.g. 2 in the above example) and another counter may be incremented for each occurrence of the default value (e.g. 0 in the above example). One or more of these counters can then be used to generate aggregate network statistics.

For instance, in an illustrative example, the network statistics estimator 602 may estimate the network statistics when the index value reaches 64 i.e. the predefined threshold value is 64. A first counter may be incremented for every occurrence of 0 in the estimator buffer 610. The network statistics estimator 602 may use the first counter to estimate aggregate lost packet statistics using the following equations:

Packet loss rate=(first counter*256/64)

Percentage packet loss=(first counter*100/64)

It will be understood that the lost packet statistics may include any data which provide information about packet loss in the network and is not limited to the example parameters calculated above. The estimation of the loss packet data statistics may be performed by any other suitable known techniques or equations.

The network statistics estimator 602 may pack the estimated lost packet statistics and out-of-order packet statistics into the network statistics report.

For instance, the estimated lost packet statistics and the estimated out-of-order statistics may be packed into multi-bit variables. In one example, the statistics may be packed into an application-defined RTCP packet as detailed in RFC 3550. This provides four 32-bit application-dependent data fields. In an example, the buffers representing the histograms can be limited to a predefined size (e.g. 30 entries), and the values at each entry (the histogram frequency) grouped into ranges, each range represented by a 2-bit value. An example of this was illustrated in the table above. This enables the histogram data to be packed into a network statistics report comprising four 32-bit data fields which is compliant with RFC 3550.

The network statistics estimator 602 may further transmit the network statistics report to the packet transmission module 102 periodically at a predefined interval. The network statistics estimator 602 may further be capable of triggering an emergency statistics report transmission in case there is a significant change in the estimated network statistics compared to a previously estimated network statistics. For instance the significant change may refer to a 3% change in the current network statistics from the previously estimated network statistics.

The received voice data payload from the network statistics estimator 602 is transmitted to the sequence number retriever 604. The sequence number retriever 604 is explained in conjunction with FIG. 8. As described above, a data stream can comprise a plurality of voice data packets, and each payload within each packet needs a sequence number to indicate its position within the data stream. Each voice data packet received from the transmitter 210 comprises a primary payload and one or more redundant payloads. The sequence number retriever 604 is used because, in standard encoding schemes, such as RFC 2198 for example, only the sequence number of the primary payload is included in the packet header. Sequence numbers for redundant data are not included in the header. Therefore, if the redundant data is to be used, then the sequence number for the redundant data must be regenerated in order to be able to put the data payloads (redundant or otherwise) in the correct order for decoding and playback.

Figure 8:
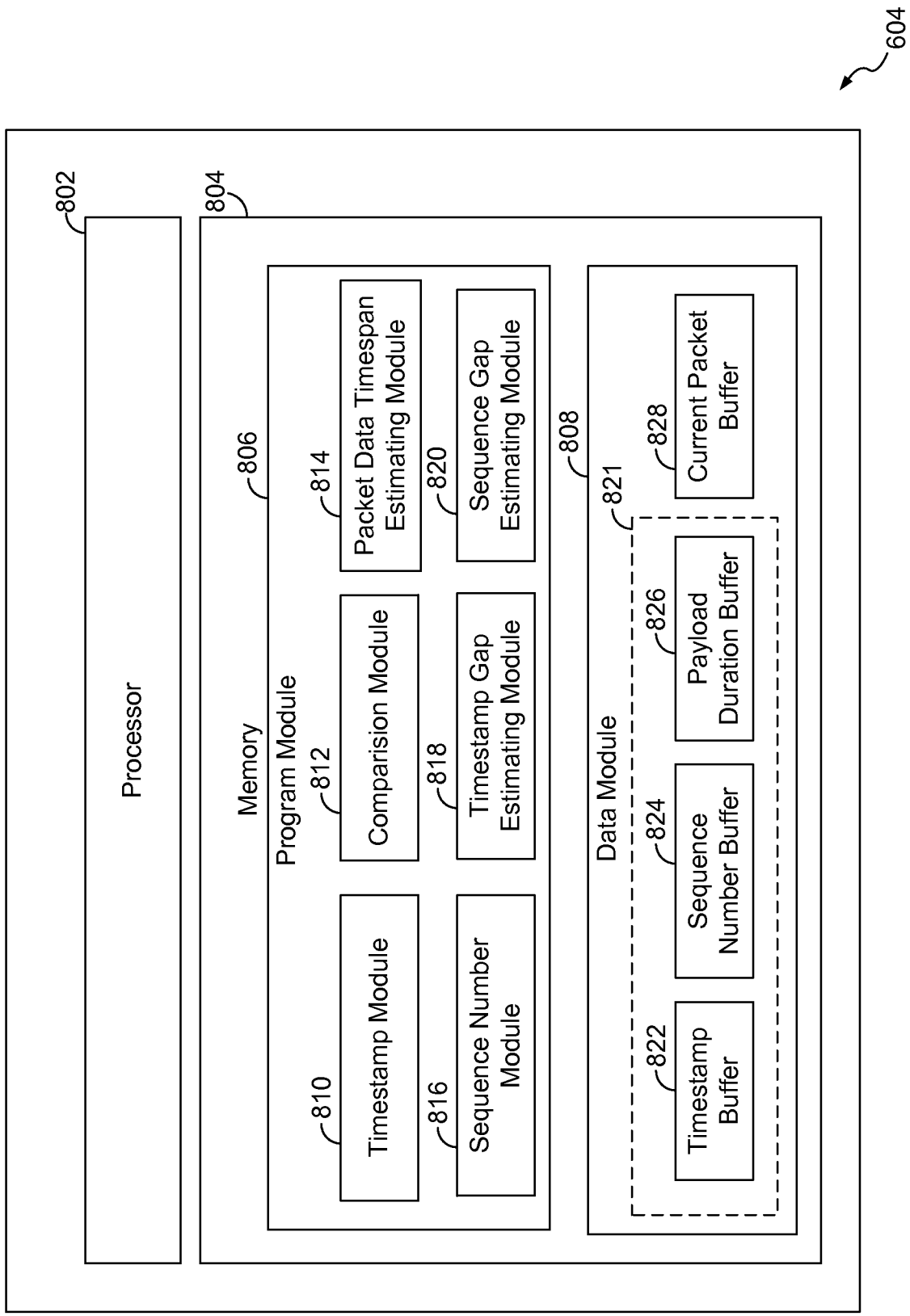
FIG. 8 is a block diagram illustrating a sequence number retriever.

FIG. 8 is a block diagram illustrating the sequence number retriever 604 in accordance with a software-implemented example. In other examples, the sequence number retriever 604 can be implemented in hardware, or as a combination of hardware and software.

In this example, the sequence number retriever 604 may include a processor 802 and a memory 804. The memory 804 further includes a program module 806 and a data module 808. The processor 802 is capable of executing a set of instructions which are stored in the program module 806 and accessing a set of data from the data module 808 required for the execution of the set of instructions.

The processor 802 may refer to a general purpose CPU or a more specialized processing unit such as a DSP or GPU, or any other processors with similar capabilities. The processor 802 is configured to process the set of instructions stored in the memory 804.

The memory 804 is connected to the processor 802. The memory 804 may be an internal memory like Static Random Access Memory (SRAM), DRAM Dynamic Random Access Memory (DRAM), Read Only Memory (ROM), Flash memory or other similar storage devices. Alternatively the memory 804 may be an external memory connected to the packet receiving module 106. The examples of such memory 804, may be Universal Serial Bus (USB) drives, hard disks, floppy disks, Compact Disk (CD) or any known similar external storage device. The memory 804 may also be any suitable combination of the above.

In this example, the program module 806 includes a timestamp module 810, a comparison module 812, a packet data time-span estimating module 814, a sequence number module 816, a timestamp gap estimating module 818 and a sequence gap estimating module 820.

The timestamp module 810 is configured to calculate a timestamp parameter for the redundant payload. The timestamp module 810 may be further configured to estimate further timestamp values relating to the timestamp parameter.

The comparison module 812 receives one or more timestamp inputs from the timestamp module 810. The comparison module 812 is configured to compare the timestamp parameter to one or more timestamps in a selected portion of a payload history buffer, as described below.

The packet data time-span estimating module 814 is configured to calculate a time span covered by all the payloads contained in the current voice data packet, and use this to select a relevant portion of the payload history buffer.

The sequence number module 816 is configured to determine a sequence number for each of the one or more redundant payloads using the results of the comparison module 812. The sequence number module 816 interoperates with the comparison module 812, the timestamp gap estimating module 818, and the sequence gap estimating module 820.

The timestamp gap estimating module 818 is configured to estimate a timestamp gap. A timestamp gap may be used by the sequence number module 816 to determine the sequence number of the one or more redundant payloads, as described below.

The sequence gap estimating module 820 is configured to estimate a sequence number gap. The sequence number gap may be used by the sequence number module 816 to determine the sequence number of the one or more redundant payloads, as described below.

The data module 808 includes the payload history buffer 821. The payload history buffer 821 comprises a plurality of entries, with one entry for each sequence number in the data stream, and each entry arranged to store at least a timestamp and sequence number value. Any previously received payloads have their timestamps and sequence numbers (either received directly or derived) recorded in the corresponding entry in the payload history buffer 821. The payload history buffer 821 is therefore a history of data relating to previously received payloads (which may have been received as a primary or redundant payload).

In one example, the payload history buffer 821 comprises a timestamp buffer 822 arranged to store timestamps of previously received payloads, a sequence number buffer 824 arranged to store received or derived sequence numbers of previously received payloads, and a payload duration buffer 826 arranged to store data relating to a duration (e.g. time in ms) covered by the previously received payload. The data module 808 may also include a current packet buffer 828, which may be used to store data relating to the current voice data packet being processed. For example, the current packet buffer 828 may contain data unpacked from the header of the current voice data packet. The header data may include, but is not limited to, a sequence number of the primary voice data payload, a timestamp of the primary voice data payload, a payload size of the primary voice data payload and one or more payload sizes and time stamp offsets for each of the one or more redundant payloads.

The sequence number retriever 604 determines the sequence number of each of the one or more redundant payloads of the received voice data packet. The method for determining the sequence number of the redundant payload of the voice data packet will now be explained in detail in conjunction with FIG. 9.

Figure 9:
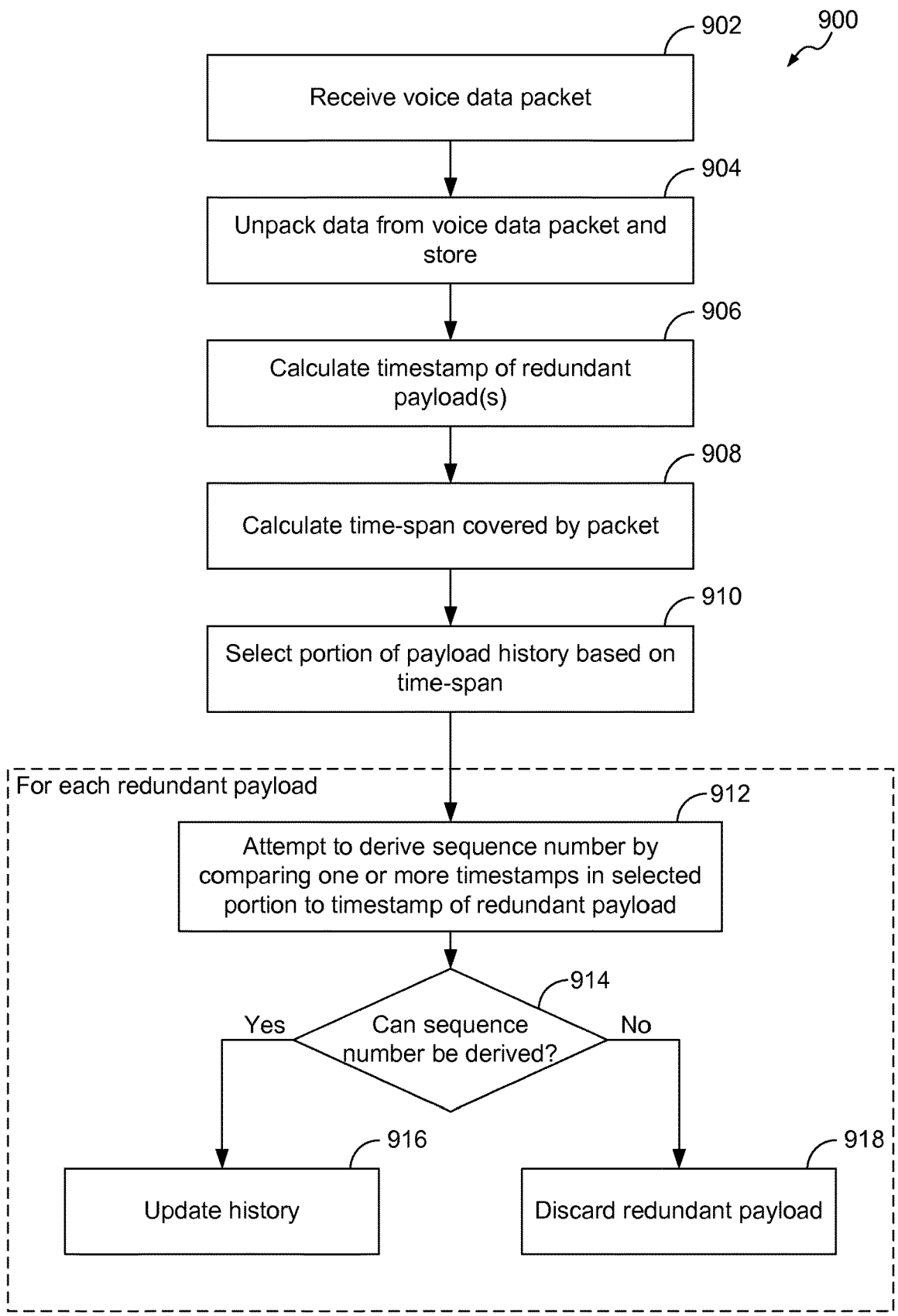
FIG. 9 is a flow diagram illustrating a method for determining a sequence number of a redundant payload of a voice data packet.

FIG. 9 is a flow diagram illustrating a method 900 for determining the sequence number of a redundant payload of the voice data packet.

At step 902, the sequence number retriever 604 receives the voice data packet, and in step 904 unpacks the data from the voice data packet and stores the data in current packet buffer 828. This includes data relating to the primary voice data payload and the one or more redundant payloads.

The data relating to the primary payload includes a sequence number associated with the primary payload, a timestamp associated with the primary payload, as well as the primary payload data itself. The data relating to the one or more redundant payloads includes a timestamp offset for each redundant payload, indicating a difference between the timestamp associated with the primary payload and that redundant payload. The unpacked data can be stored in the current packet buffer 828. The timestamp and sequence number data for the primary payload can also be stored in the payload history buffer 821.

Note that in the following example, the timestamps are measured in units of number of samples, and relate to the number of samples of the voice data that have been taken up to that point. The timestamp associated with a payload therefore records the sample number at the start of the payload. In other examples, alternative techniques for recording the time of creation of a payload can be used (such as a time of day or other counter). Other examples can also record the time at the end of the payload, rather than the start.

At step 906, for each of the one or more redundant payloads the timestamp module 810 calculates a timestamp parameter. The timestamp parameter may be calculated by subtracting the timestamp offset of the redundant payload from the timestamp of the primary payload. The timestamp offset of the redundant payload and the timestamp of the voice data payload may be retrieved from the current packet buffer 828. The timestamp parameter for each redundant payload therefore refers to the timestamp (in samples) associated with that redundant payload.

In some examples, additional information about the payloads in the voice data packet may also be calculated at this stage (not shown in FIG. 9). For example, a payload duration may be calculated for the primary payload and each redundant payload. The payload duration refers to a time period (e.g. measured in ms) of voice data that the payload covers. Given that the voice data is sampled at a known sampling rate, the payload duration is therefore a measure of size of the payload. The payload duration can be determined from information in the header of the voice data packet. For example, the payload duration can be determined from the amount of data in the payload (e.g. in bytes) and a payload type (e.g. indicating the type of encoding used). Once the payload duration has been determined it can be stored in the current packet buffer 828, and in the payload history buffer 821 (once the appropriate location in the payload history buffer 821 for the relevant payload is determined). In one example, the payload duration can be stored as an integer multiple of the smallest possible payload duration. For example, if the smallest payload duration that can be transmitted is 10 ms, then the payload duration can be stored as integer multiples of 10 ms (e.g. storing a value of 3 for a 30 ms payload duration). In alternative examples, the payload duration can be converted to another measure of size, such as the number of voice data samples in the payload by multiplying the payload duration by a known sampling rate, and this value can be stored. In further alternative examples, values such as the payload duration can be calculated as needed during other operations, rather than being calculated in advance as described above.

At step 908, the overall time-span covered by the voice data packet is determined by the packet data time-span estimating module 814. In other words, the range (in time) of the voice data contained in the packet from both the primary and redundant data is calculated. This is determined by finding the largest timestamp offset, which indicates which of the redundant payloads is the earliest that is present in the voice data packet. The maximum timestamp offset gives the difference in samples between the primary payload and the oldest redundant payload. If the maximum offset (in samples) is divided by a known value for the sampling rate (e.g. in samples per ms), then this gives a value (in ms in this example) for the time duration or time-span covered between the primary payload and the oldest redundant payload.

In step 910 a portion of the payload history buffer 821 is selected based on the time-span. To do this, a history index value is calculated that corresponds to the worst-case (i.e. oldest) entry in the history that can be covered by the voice data packet. The time-span of the packet is multiplied by a predefined value that corresponds to the smallest possible packet duration (e.g. in ms in this example). For example, it may be known that the smallest packet that can be transmitted contains 10 ms voice data. Therefore, in this example, it can be determined that the maximum number of packets covered by the time-span is given by the time-span divided by 10. As the payload history buffer 821 comprises an entry for each payload, the index of the earliest possible entry relating to the voice data packet can be calculated by subtracting the maximum number of packets covered by the time span from the index of the primary payload.

The selection of the portion of the payload history buffer 821 can then be based on the index of the earliest possible entry relating to the voice data packet and the index of the primary payload. In one example, the selection comprises each entry in the payload history buffer 821 from and including the index of the earliest possible entry relating to the voice data packet up to the index of the primary payload. In another example, the selection also includes the primary payload entry. In a further example, the selection also includes the prior entry immediately preceding the index of the earliest possible entry relating to the voice data packet.

Figure 10:
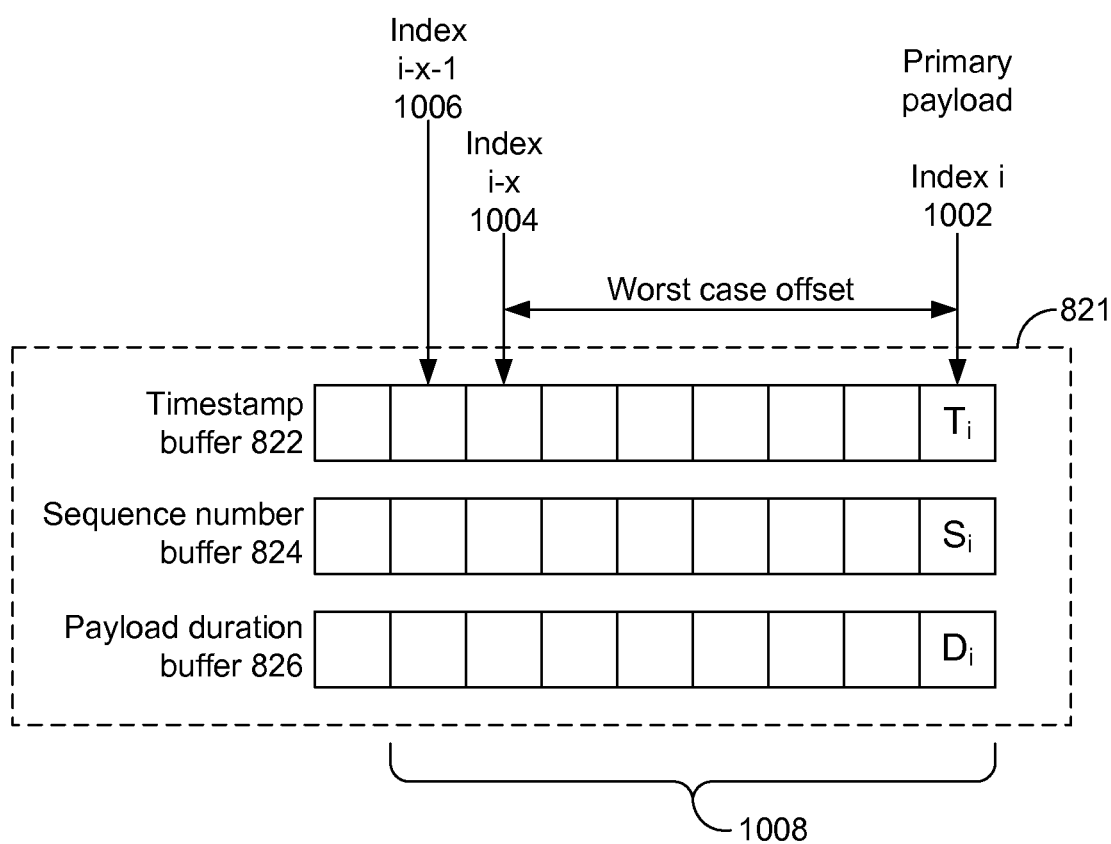
FIG. 10 illustrates an exemplary snapshot of a packet data time span.

FIG. 10 shows an example of the payload history buffer 821 and illustrates the selection of the portion of the payload history buffer 821. This payload history buffer 821 comprises the timestamp buffer 822, the sequence number buffer 824 and the payload duration buffer 826, as mentioned above. Each of these buffers has an entry available for each payload. The primary payload is shown at an index i 1002, and values for the timestamp $T_i$, sequence number $S_i$, and payload duration $D_i$, have been stored in the payload history buffer 821 for the primary payload. No entries have been added for the redundant payloads yet, as the positions of these in the payload history buffer 821 are not yet known (as the sequence numbers have not been calculated yet). Values associated with previously received payloads may also be present in the payload history buffer 821, but are not shown here for clarity.

Using the maximum offset, the worst case number of payloads covered by the voice data packet is determined as above. In the example of FIG. 10, this is x packets. The index of the payload history buffer 821 corresponding to the earliest payload that may be covered by the packet is therefore index i-x. The index of the history immediately preceding i-x is therefore index i-x-1 1006. The selected portion of the payload history buffer 821 in this example is the portion from i-x-1 1006 to i 1002, such that it includes the primary payload entry, all consecutive preceding entries that could be covered by the voice data packet, and the entry immediately preceding this.

Once the portion of the payload history buffer 821 has been selected, then a number of steps are performed for each redundant payload in the voice data packet. In examples in which there is a plurality of redundant payloads in the voice data packet, then the redundant payloads can be processed in different ways. In one example, the redundant payloads may be arranged in a specific order with respect to the primary payload. The specific order may refer to an ascending order according to the timestamp offset of the one or more redundant payloads. Each of the redundant payloads can then be processed in turn to attempt to derive the sequence number, as described below. In other examples, a different order can be used (such as a descending order), or the redundant payloads can be processed in parallel. In further examples, the redundant payloads can be processed in one order (e.g. ascending timestamp order), and then processed again in a different order (e.g. descending order).

In step 912 the process attempts to derive the sequence number for the redundant payload in question. This is done by comparing the timestamp parameter for the redundant payload (or a derivative thereof) to one or more of the timestamps (or derivatives thereof) from the selected portion of the payload history buffer 821. This may comprise multiple stages or techniques for deriving the sequence number, as outlined below. Following this, it is determined in step 914 whether the sequence number for the redundant payload was able to be derived. If so, then in step 916 the payload history buffer 821 is updated to store the sequence number, timestamp data and payload duration for redundant payload at the appropriate location. If, however, it was determined in step 914 that the sequence number could not be derived, then in step 918 the redundant payload is discarded.

Figure 11:
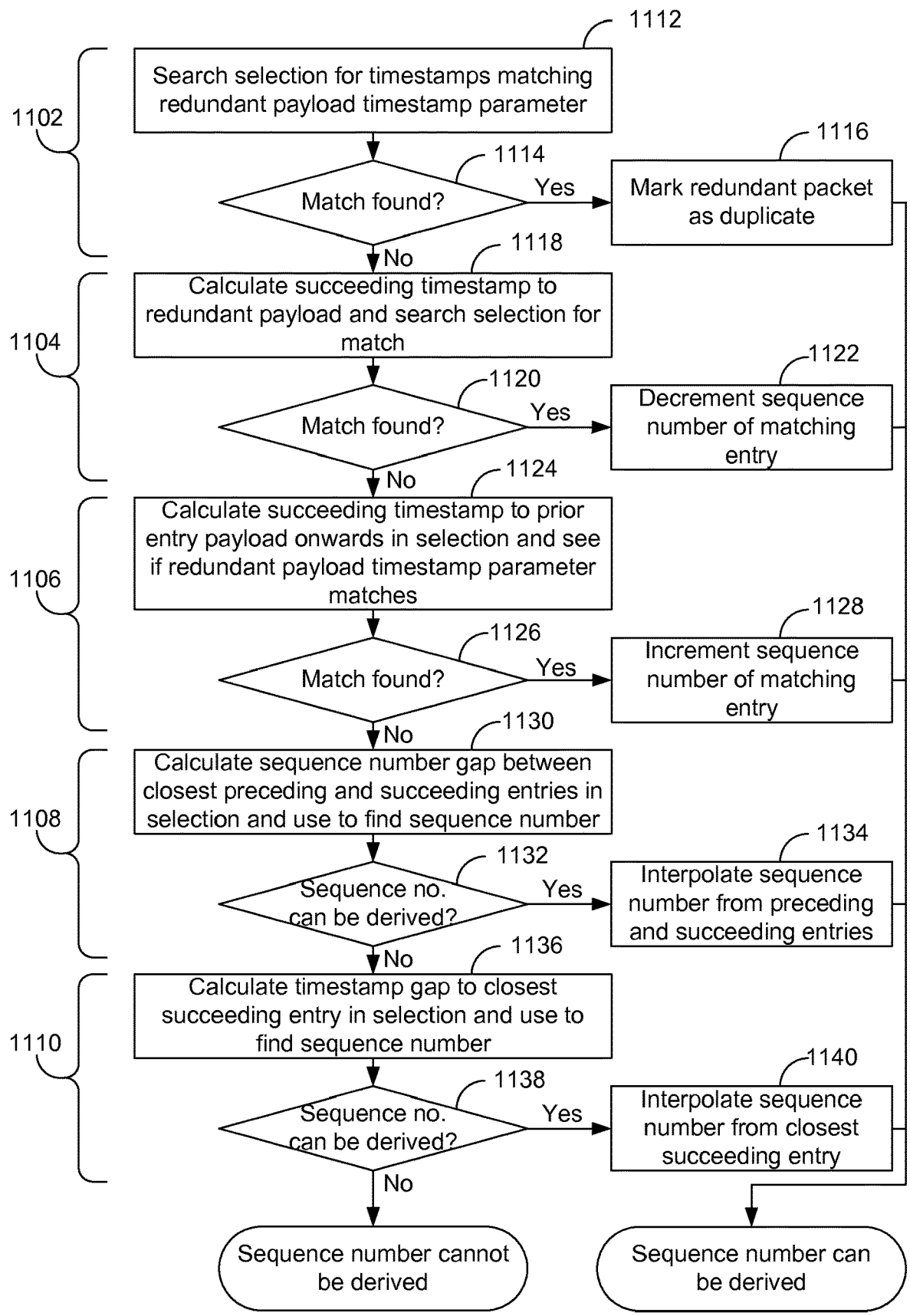
FIG. 11 is a flow diagram illustrating a detailed method for determining a sequence number of a redundant payload of a voice data packet.

In some examples, step 912 can be an iterative process, such that several different techniques are attempted in turn to derive the sequence number. The flowchart in FIG. 11 illustrates an example of a sequence of different techniques that can be applied in step 912 to derive the sequence number from the selected portion of the payload history buffer 821 for a redundant payload. However, note that, in different examples, these different techniques can be combined in a different order, or only a selection of one or more of the techniques can be utilized.

Referring to FIG. 11, five different techniques 1102 to 1110 are illustrated for finding the sequence number. Each of these are tried in turn, and the process stops whenever the sequence number is found. As noted above, in alternative examples, these techniques could be applied in a different order, or in parallel, or one or more of them can be omitted. In some examples, one or more of the techniques may also be repeated. For example, when more than one redundant payload is present, then one or more of the techniques of FIG. 11 can be executed for each redundant payload in a particular sequence (e.g. ascending timestamp order), and then repeated for each redundant payload in a different sequence (e.g. descending timestamp order). This enables the sequence number data that is derived for some redundant payloads to be used to help derive the sequence numbers for other redundant payloads in the voice data packet.

The first technique 1102 searches, in step 1112, the selected portion of the payload history buffer 821 to determine whether any timestamps in the selected portion are equal to the timestamp parameter of the redundant payload. If, in step 1114 a matching timestamp is found in the selected portion, then this means that the redundant payload has already been received, as otherwise an equal timestamp would not be present in the payload history buffer 821. For example, the redundant payload may already have been received as a primary payload in a previous packet, or as another redundant payload in a previous packet. In this case, in step 1116, the redundant payload is marked as a duplicate, and the process exits as the sequence number has been derived for this payload (as it was already known).

However, if in step 1114 a matching timestamp was not found, then the process moves to technique 1104. In step 1118, the timestamp parameter and other data about the redundant payload is used to calculate the timestamp of the payload immediately succeeding the redundant payload (called the "subsequent timestamp" herein). The selected portion of the payload history buffer 821 is then searched to determine whether it contains a timestamp equal to the subsequent timestamp. In other words, this technique is determining whether the next payload after the redundant payload has already been received. This may compare the subsequent timestamp against any entry in the selected portion, including the primary payload timestamp.

The subsequent timestamp may be calculated by determining the size in samples of the redundant payload. This is determined by multiplying the payload duration (as described above) by the sample rate. This measure of size in samples for the redundant payload can then be added to the timestamp parameter to obtain the subsequent timestamp.

If it is determined in step 1120 that a matching timestamp has been found in the selected portion, then the sequence number for the redundant payload can be calculated by decrementing the sequence number for the entry having the matching timestamp by one in step 1122. The process then exits as the sequence number has been found.

If in step 1120 a matching timestamp was not found, then the process moves to technique 1106. In step 1124, the timestamp of the earliest payload in the selected portion is read (this is the prior entry described above). The timestamp of the next payload immediately succeeding the earliest payload in the selected portion is then determined. This may be done by determining a measure of size of the earliest payload. The measure of size may be found by reading the payload duration for the earliest payload in the selected portion (which may be stored in the payload history buffer 821 in the payload duration buffer 826) and multiplying this by the sample rate. This gives a value for the size of the earliest payload in samples, which can be added to the earliest payload timestamp to get the timestamp of the payload immediately succeeding the earliest payload. The timestamp parameter for the redundant payload is then compared to the calculated timestamp of the payload immediately succeeding the earliest payload to determine whether they are equal. If not, then the next earliest payload in the selected portion can be selected, and the timestamp of the payload immediately succeeding this can be calculated and compared to the timestamp parameter. This can be repeated for each entry in the selected portion of the payload history buffer 821, from the prior entry up to the primary payload.

If in step 1126 a match is found, then the sequence number can be calculated in step 1128 by incrementing by one the sequence number for the entry in the selected portion having the matching timestamp. In other words, technique 1106 is determining whether there is a payload entry recorded in the payload history buffer 821 that is immediately before (i.e. has an earlier sequence number than) the redundant payload, and uses this preceding payload entry to calculate the sequence number.

If in step 1126 a matching timestamp was not found, then the process moves to technique 1108. In step 1130, the closest preceding entry to the redundant payload in the selected portion having sequence number and timestamp values is found. This can be done by finding the entry in the selected portion having the maximum timestamp that is less than the timestamp parameter of the redundant payload. In addition, the closest succeeding entry to the redundant payload in the selected portion having sequence number and timestamp values is also found. This can be done by finding the entry in the selected portion having the minimum timestamp that is greater than the timestamp parameter of the redundant payload.

A sequence number gap is calculated as the difference between the sequence number of the closest preceding entry and the closest succeeding entry. It is then determined in step 1132 whether the sequence number can be derived using the sequence number gap. Firstly, the sequence number gap is used to determine whether there are three missing payloads between the closest preceding entry and the closest succeeding entry. For example, the table below illustrates a scenario in which the closest preceding entry (given an index i here) has a timestamp $T_i$ and a sequence number $S_i$, and the closest succeeding entry (given an index j here) has a timestamp $T_j$ and a sequence number $S_j$. The redundant payload has a timestamp $T_r$ (where $T_i < T_r < T_j$) and an unknown sequence number $S_r$. In this example, there are empty entries either side of the redundant payload, and hence there are three entries between the closest preceding entry and the closest succeeding entry. This can be determined by the sequence number gap having a value of 4. Because it is known that there are three entries between the closest preceding entry and the closest succeeding entry, and from techniques 1104 and 1106 it is known that there is not an entry with a sequence number immediately adjacent to the redundant payload, it can be deduced that the redundant payload is occupying the middle position. This means that the sequence number can be found as the value mid-way between the sequence numbers of the closest succeeding entry and closest preceding entry. This can be calculated either by subtracting two from the sequence number of the closest succeeding entry or adding two to the sequence number of the closest preceding entry.

| $T_i$ | — | $T_r$ | — | $T_j$ |
|---|---|---|---|---|
| $S_i$ | — | $S_r$ | — | $S_j = S_i + 4$ |

If it is determined that there are more than three missing payloads between the closest succeeding entry and closest preceding entry, then a timestamp difference can be used with the sequence gap to attempt to derive the sequence number. The timestamp difference is given by the difference between the timestamp of the closest succeeding entry and the timestamp of the closest preceding entry (i.e. $T_j - T_i$ in the example above). A measure of size for the closest preceding payload is found, for example by multiplying its payload duration by the sample rate. It is then determined whether the measure of size for the closest preceding payload multiplied by the sequence number gap is equal to the timestamp difference. In other words, it is determined whether the payload size for the closest preceding entry fits given the known number of missing payloads up to the closest succeeding entry and the known timestamp difference (i.e. if the payload size of the closest preceding entry is applied to the missing payloads, does this fit with the known data). If so, then the sequence number can be interpolated using this payload size.

If not, then the same calculation is performed for the closest succeeding entry. A measure of size for the closest succeeding payload is found, for example by multiplying its payload duration by the sample rate. It is then determined whether the measure of size for the closest succeeding payload multiplied by the sequence number gap is equal to the timestamp difference. In other words, it is determined whether the payload size for the closest succeeding entry fits given the known number of missing payloads back to the closest preceding entry and the known timestamp difference (i.e. if the payload size of the closest succeeding entry is applied to the missing payloads, does this fit with the known data). If so, then the sequence number can be interpolated using this payload size.

If not, then the same calculation is performed for the redundant payload. The measure of size for the redundant payload is found, for example by multiplying its payload duration by the sample rate. It is then determined whether the measure of size for the redundant payload multiplied by the sequence number gap is equal to the timestamp difference. In other words, it is determined whether the payload size for the redundant payload fits given the known number of missing payloads in the sequence number gap and the known timestamp difference (i.e. if the payload size of the redundant payload is applied to the missing payloads, does this fit with the known data). If so, then the sequence number can be interpolated using this payload size. Note that in other examples, these calculations can be performed in a different order, or in parallel.

If it is determined in step 1132 that the sequence number can be derived, then in step 1134 the sequence number is determined by interpolating values from the closest succeeding and closest preceding entries.

As noted above, in the case where there are three missing payloads between the closest succeeding entry and closest preceding entry, this can be done by selecting the mid-point sequence number between the closest succeeding entry and closest preceding entry (e.g. by adding two to the closest preceding sequence number, or subtracting two from the closest succeeding sequence number).

In the case where the payload size of the closest preceding entry is found to fit the missing data, then the sequence number can be found by using the payload size for the closest preceding entry. For example, the difference in the timestamps between the redundant payload and the closest preceding entry can be found, and divided by this payload size to determine how many payloads are present between the closest preceding entry and the redundant payload. The sequence number of the closest preceding entry can then be increased by this amount to give the sequence number of the redundant payload.

In the case where the payload size of the closest succeeding entry is found to fit the missing data, then the sequence number can be found by using the payload size for the closest succeeding entry. For example, the difference in the timestamps between the redundant payload and the closest succeeding entry can be found, and divided by this payload size to determine how many payloads are present between the closest succeeding entry and the redundant payload. The sequence number of the closest succeeding entry can then be decreased by this amount to give the sequence number of the redundant payload.

In the case where the payload size of the redundant payload is found to fit the missing data, then the sequence number can be found by using the payload size for the redundant payload. For example, the difference in the timestamps between the redundant payload and the closest preceding entry can be found, and divided by this payload size to determine how many payloads are present between the closest preceding entry and the redundant payload. The sequence number of the closest preceding entry can then be increased by this amount to give the sequence number of the redundant payload. Note that in alternative examples, the sequence number can also be found relative to the closest succeeding entry in this case.

Once the sequence number has been derived by one of these interpolation processes, then the process of FIG. 11 exits. If, however, it was found in step 1132 that the sequence number for the redundant payload has not been derived, then the process moves to technique 1110. In step 1138, the closest succeeding entry to the redundant payload in the selected portion having sequence number and timestamp values is found. A timestamp gap is calculated as the difference between the timestamp of the closest succeeding entry and the timestamp parameter for the redundant payload. It is then determined whether the timestamp gap is an integer multiple of the measure of size for the redundant payload. If so, then the sequence number can be derived. If it is determined in step 1138 that the sequence number can be derived, then in step 1140 the sequence number is derived by using the redundant payload size to determine how many payloads are located between the redundant payload and the closest succeeding entry. This can be done by dividing the timestamp gap by the redundant payload size. The sequence number can then be found by subtracting this value from the sequence number of the closest succeeding entry.

Note that technique 1110 can also be performed using the closest preceding entry instead of the closest succeeding entry. In this case, the timestamp gap is between the closest preceding entry and the redundant payload, and the sequence number is found by adding the number of payloads calculated to be between the closest preceding entry and the redundant payload to the sequence number of the closest preceding entry.

If the sequence number has been derived in step 1140, then the process exits. Otherwise, in the example of FIG. 11, it is determined that the sequence number cannot be derived for the redundant payload and the process exits.

Referring again to FIG. 6, the duplicate payload discarder 606 receives the primary payload and the one or more redundant payloads along with the sequence number of the primary payload and the sequence number of the redundant payloads from the sequence number retriever 604. The duplicate payload discarder 606 may include a duplicate payload buffer 612. The duplicate payload buffer 612 has locations that correspond to payloads in the data stream, and maintains a predefined value at each location. For instance, the predefined value may correspond to 0, 1 or 2 depending on a status of the corresponding payload. When a given payload is received as a primary payload, the predefined value at the location corresponding to that payload is set to 1. In the case that the payload is received as a redundant payload, the predefined value at the location corresponding to that payload is set to 2. The predefined value may be 0 for payloads which are not received.

The duplicate payload discarder 606 finds the appropriate location in the duplicate payload buffer 612 for the primary payload, and sets the value to 1, and then finds the location for each of the redundant payloads. If the location for a redundant payload contains a 0, then this means that the payload has not previously been received, and this is updated to a 2 to indicate that it has now been received as a redundant payload. If, however, the location contains a value other than 0 (i.e. 1 or 2 in this example), then this means that the payload has previously been received, and the redundant payload can be discarded.

Figure 12:
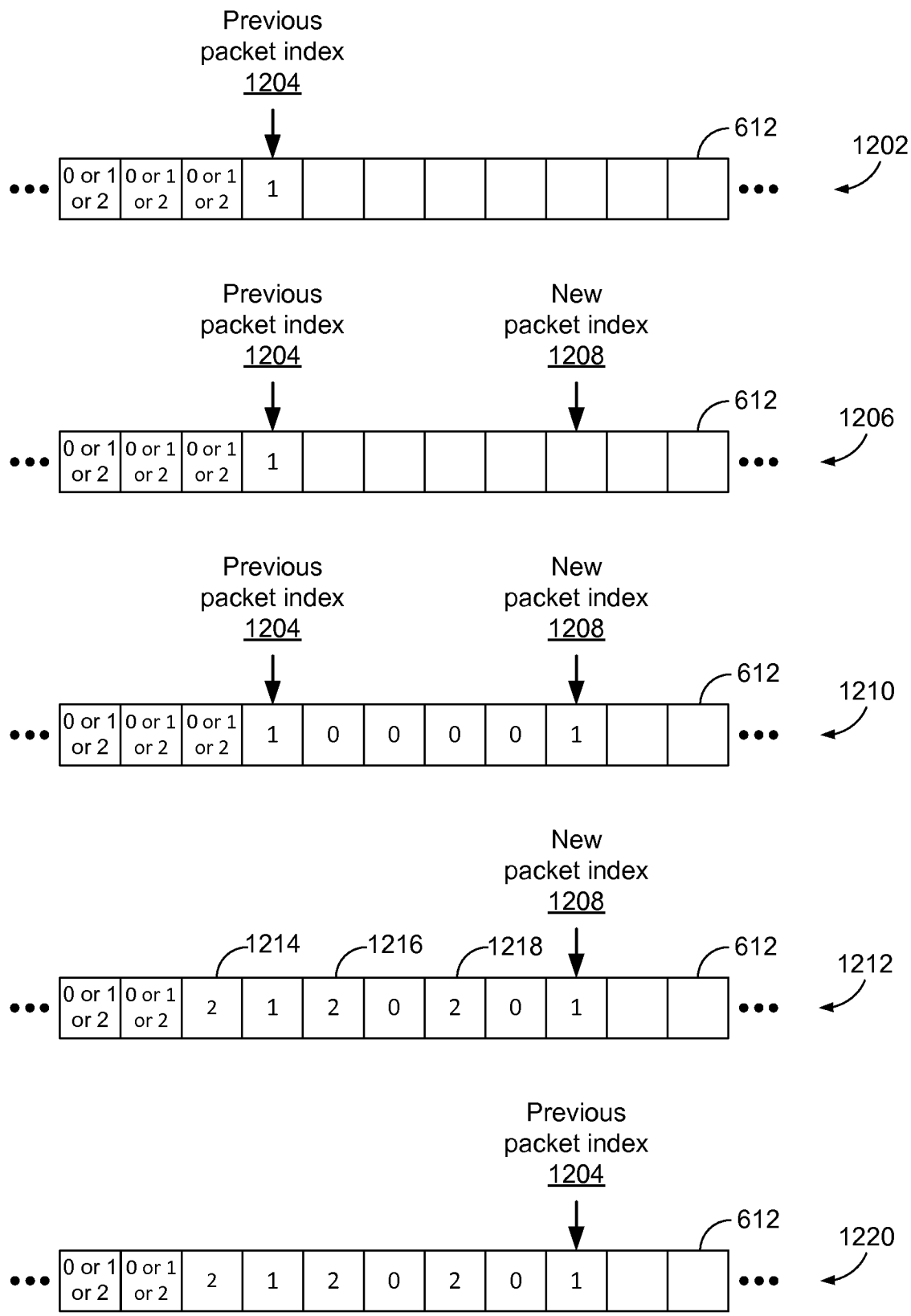
FIG. 12 illustrates an example sequence of operations for an efficient duplicate detection scheme.

FIG. 12 illustrates an example sequence of operations for updating the duplicate payload buffer 612 such that duplicates can be quickly and efficiently identified and discarded. In particular, the technique shown in FIG. 12 does not require the use of searches, and hence reduces the need for complex calculations and reduces memory storage. The duplicate payload buffer 612 is illustrated at 1202. An index 1204 is maintained in the duplicate payload buffer 612 that points to a location corresponding to the primary payload of the previous voice data packet. The value in the buffer 612 at the previous packet index is 1 (indicating this was received as a primary payload, as mentioned above). The entries prior to this in the buffer 612 have values of 0, 1 or 2, depending on how they have been set by previous packets.

At 1206, a new packet index 1208 value is calculated. In the case that the primary payload of the newly received voice data packet is not received out-of-order, then this is calculated as the difference between the sequence number of the primary payload of the newly received voice data packet and the sequence number of the primary payload of the previously received voice data packet. For example, in the illustrative case of FIG. 12, the sequence number difference is 5. Note that if the newly received voice data packet is an out-of-order packet (i.e. a negative sequence number difference would be calculated), then the new packet index 1208 is set to the same as the previous packet index 1204.

If the newly received voice data packet was not an out-of-order packet, then at 1210 the value in the buffer 612 at the new packet index 1208 is set to 1 (indicating that this was received as a primary payload). The values in the buffer 612 between, but not including, the new packet index 1208 and the previous packet index 1204 are initialized to zero.

The sequence numbers of the redundant payloads in the newly received voice data packet (as output from the sequence number retriever 604) are then analysed. The difference between the sequence number of the primary payload of the newly received voice data packet and each of the redundant payloads are found. In other words, a sequence number offset from the primary payload is calculated for each redundant payload. The sequence number offset for each redundant payload is subtracted from the new packet index 1208 to find a location in the buffer 612 corresponding to each redundant payload. This is illustrated at 1212, where the redundant payloads have offsets of 2, 4 and 6 from the primary payload. As mentioned above, if the location for a redundant payload contains a 0, then this means that the payload has not previously been received, and this is updated to a 2 to indicate that it has now been received as a redundant payload. This is illustrated in the example at 1212, where a value of 2 is stored at 1214, 1216 and 1218, corresponding to each of the offset locations. If, however, the location contains a value other than 0 (i.e. 1 or 2 in this example), then this means that the payload has previously been received, and the redundant payload can be discarded. Finally, at 1220 the value for the previous packet index 1204 is updated to be the same as the new packet index 1208, ready for the next voice data packet to be received.

In some examples, the duplicate payload buffer 612 can be configured as a circular buffer, so that the new packet index can wrap around to the start of the buffer if it extends beyond the end of the buffer. This enables the buffer 612 to operate regardless of how many packets are received, without needing to keep storing more and more data, but still provides information on a portion of voice data most recently received.

After discarding the duplicate payloads, the duplicate payload discarder 606 passes the primary payload and the one or more redundant payloads to the decoder 608.

The decoder 608 decodes the received payloads forwards the decoded payloads to the adaptive jitter buffer 614. The adaptive jitter buffer 614 re-arranges the payloads in sequence and plays out the decoded payloads as and when needed.

The adaptive jitter buffer 614 is further capable of estimating a network jitter using the duplicate payload buffer 612. The adaptive jitter buffer 614 estimates the network jitter from only those payloads shown in the duplicate payload buffer 612 as being received as primary payloads (e.g. having a value of 1 at their location).

The decoded payloads are played out by the adaptive jitter buffer 614 in a proper sequence to the second user 108b.

Generally, any of the functions, methods, techniques or components described above can be implemented in modules using software, firmware, hardware (e.g., fixed logic circuitry), or any combination of these implementations. The terms "module" and "block" are used herein to generally represent software, firmware, hardware, or any combination thereof.

In the case of a software implementation, the module represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method for transmitting voice data packets with redundancy in a network, the method comprising:
    receiving voice data;
    classifying the received voice data as voiced or unvoiced based only on information in the received voiced data;
    encoding the received voice data as a voice data payload;
    packetizing the voice data payload to generate a voice data packet including the voice data payload, the voice data packet further including at least one redundant payload selected from a set of previous voice data payloads;
    determining an unvoiced encoded voice data payload to be a critical payload;
    determining a voiced encoded voice data payload to be a non-critical payload;
    adding only a critical payload to the set of previous voice data payloads for inclusion as a redundant payload in subsequent voice data packets; and
    forwarding the voice data packet for transmission over the network.

2. The method of claim 1, further comprising: receiving a network statistics report and estimating a redundancy value based on the network statistics report, and wherein the number of redundant payloads is based on the redundancy value.

3. The method of claim 2, wherein the network statistics report comprises at least one of: out-of-order packet statistics for packets previously sent for transmission over the network; and lost packet statistics for packets previously sent for transmission over the network.

4. The method of claim 1, further comprising calculating a waveform similarity factor for received voice data classified as voiced.

5. The method of claim 4, wherein calculating the waveform similarity factor comprises deriving a pitch for the voice data.

6. The method of claim 4, wherein calculating the waveform similarity factor comprises setting the waveform similarity factor to zero for voice data determined to be noise.

7. The method of claim 4, wherein the determining of a voiced encoded voice data payload further comprises: calculating a variance value using the waveform similarity factor and comparing the variance value to a threshold value to determine whether the voice data payload is a critical payload.

8. The method of claim 1, wherein a non-critical payload is not added to the set of previous voice data payloads.

9. The method of claim 1, wherein the packetizing further comprises
    determining that one or more preceding voice data payloads were selectively dropped prior to transmission over the network, and adding one or more of the dropped preceding voice data payloads to the voice data packet.

10. The method of claim 1, further comprising, subsequent to forwarding the voice data packet: determining whether to drop the voice data payload without transmitting it over the network.

11. A system for transmitting voice data packets with redundancy in a network, the system comprising:
    an encoder configured to receive voice data and generate an encoded voice data payload from the voice data;
    a packetizer configured to packetize the encoded voice data payload to generate a voice data packet including the encoded voice data payload, the voice data packet further comprising at least one redundant payload selected from a set of previous voice data payloads;
    a packet identifier configured to classify the received voice data as voiced or unvoiced based only on information in the received voice data, determining an unvoiced encoded voice data payload to be a critical payload, determining a voiced encoded voice data payload to be a non-critical payload, and, adding only a critical payload to the set of previous voice data payloads for inclusion as a redundant payload in subsequent voice data packets; and
    a transmitter configured to forward the voice data packet for transmission over the network.

12. The system of claim 11, further comprising: a network report receiver configured to receive a network statistics report; and a redundancy estimator configured to estimate a redundancy value based on the network statistics report, wherein the number of redundant payloads is based on the redundancy value.

13. The system of claim 11, wherein the packet identifier is configured to calculate a waveform similarity factor for the received voice data classified as voiced.

14. The system of claim 13, wherein the packet identifier calculates the waveform similarity factor based on a pitch of the voice data, and sets the waveform similarity factor to zero for voice data determined to be noise.

15. The system of claim 13, wherein, for voice data classified as voiced, the packet identifier is configured to calculate a variance value using the waveform similarity factor and compare the variance value to a threshold value to determine whether the voice data payload is a critical payload.

16. The system of claim 11, wherein a non-critical payload is not added to the set of previous voice data payloads.

17. The system of claim 11, wherein the packetizer is further configured to determine that one or more preceding voice data payloads were selectively dropped prior to transmission over the network, and add one or more of the dropped preceding voice data payloads to the voice data packet.

18. The system of claim 11, wherein the transmitter is further configured to determine whether to drop the voice data payload, subsequent to forwarding the voice data packet.

19. The system of claim 11, wherein the network statistics report comprises at least one of: out-of-order packet statistics for packets previously sent by the transmitter; and lost packet statistics for packets previously sent by the transmitter.

20. A non-transitory computer readable storage medium having stored therein computer-executable instructions that cause a computer to:
- receive voice data and encode the voice data as a voice data payload;
- packetize the voice data payload to generate a voice data packet including the voice data payload, the voice data packet further including at least one redundant payload selected from a set of previous voice data payloads;
- classify the received voice data as voiced or unvoiced based only on information in the received voice data;
- determine an unvoiced encoded voice data payload to be a critical payload;
- determine a voiced encoded voice data payload to be a non-critical payload;
- add only a critical payload to the set of previous voice data payloads for inclusion as the redundant payload in subsequent voice data packets; and
- forward the voice data packet for transmission over the network.

* * * * *